(12) United States Patent
Nakamura

(10) Patent No.: US 7,530,367 B2
(45) Date of Patent: May 12, 2009

(54) PRESSURE REGULATOR

(76) Inventor: Yasuaki Nakamura, c/o Tokai Corporation, 3-4, Shimohara, Subashiri, Oyama-cho, Sunto-gun, Shizuoka-ken (JP)

( * ) Notice: Subject to any disclaimer, the term of this patent is extended or adjusted under 35 U.S.C. 154(b) by 56 days.

(21) Appl. No.: 11/626,333

(22) Filed: Jan. 23, 2007

(65) Prior Publication Data

US 2007/0144591 A1   Jun. 28, 2007

Related U.S. Application Data

(63) Continuation of application No. 10/788,348, filed on Mar. 1, 2004, now Pat. No. 7,165,575.

(30) Foreign Application Priority Data

| Mar. 3, 2003 | (JP) | ............................. 2003-055453 |
| Apr. 18, 2003 | (JP) | ............................. 2003-114260 |
| May 12, 2003 | (JP) | ............................. 2003-132876 |

(51) Int. Cl.
*G05D 16/06* (2006.01)

(52) U.S. Cl. .................................. 137/613; 137/505.42
(58) Field of Classification Search .................. 137/613
See application file for complete search history.

(56) References Cited

U.S. PATENT DOCUMENTS 7,165,575 B2 *   1/2007   Nakamura ................... 137/613

* cited by examiner

*Primary Examiner*—Kevin L Lee
(74) *Attorney, Agent, or Firm*—Trojan Law Offices

(57) ABSTRACT

A main valve reduces an unregulated pressure of a high-pressure gas to a regulated pressure by being interlocked with a diaphragm, which receives the regulated pressure within a pressure regulating chamber and is displaced. A subsidiary valve is interlocked with the main valve through a plunger and reduces the unregulated pressure of the high-pressure gas to the regulated pressure. The subsidiary valve is located such that the force, which accompanies a pressure loss occurring at the subsidiary valve and which the subsidiary valve receives, cancels the force, which accompanies the pressure loss occurring at the main valve and acts upon the plunger. An adjustor adjusts a pressure loss value occurring at the subsidiary valve so as to be equal to the pressure loss value occurring at the main valve.

2 Claims, 11 Drawing Sheets

PRESSURE REGULATOR

PRIORITY CLAIM

This is a continuation application of a U.S. patent application Ser. No. 10/788,348 filed Mar. 1, 2004, now U.S. Pat. No. 7,165,575 which claims priority to Japanese applications serial nos. 055453/2003, 114260/2003, and 132876/2003 filed Mar. 3, 2003, Apr. 18, 2003, and May 12, 2003, respectively.

INCORPORATION BY REFERENCE

The U.S. patent application Ser. No. 10/788,348 filed Mar. 1, 2004 now U.S. Pat. No. 7,165,575 is hereby incorporated by reference.

BACKGROUND OF THE INVENTION

1. Field of the Invention

This invention relates to a pressure regulator for reducing an unregulated pressure of an introduced high-pressure gas and obtaining a predetermined regulated pressure, which pressure regulator is suitable for use in liquefied gas utilizing appliances, gas supply facilities, and the like, and particularly for stabilization of fuel supply to solid oxide type fuel cells (SOFC's) and solid polymer type fuel cells (PEFC's).

2. Description of the Related Art

Ordinarily, liquefied gases and ordinary high-pressure gases, which have been accommodated in, for example, gas cylinders, have very high unregulated pressures and cannot be utilized directly. Also, the unregulated pressures of the liquefied gases and the ordinary high-pressure gases fluctuate markedly due to factors, such as an ambient temperature and a residual gas quantity. Therefore, pressure regulators (or pressure governors) for reducing the pressures of the high-pressure gases have heretofore been utilized widely in liquefied gas utilizing appliances, gas supply facilities, and the like. The pressure regulators have structures, wherein a regulated pressure is detected by a diaphragm, a regulating valve capable of moving in accordance with a displacement of the diaphragm is operated such that the regulated pressure becomes equal to a predetermined pressure in cases where the unregulated pressure fluctuates, and the predetermined regulated pressure is thereby obtained. (A pressure regulator having the structure described above is described in, for example, Patent Literature 1.)

The pressure regulators having various structures designed in accordance with required operating ranges of unregulated pressures, required response characteristics, and required stability have been used in practice. In accordance with the quality required of the regulated pressure, one kind of a pressure regulator or a combination of several kinds of pressure regulators has heretofore been used, and the predetermined regulated pressure has thus been obtained.

Fundamental structures of ordinary pressure regulators will be described hereinbelow with reference to FIGS. 15A, 15B, and 15C. FIGS. 15A, 15B, and 15C are schematic views showing fundamental structures of ordinary pressure regulators. FIG. 15A is a schematic view showing a single-valve type pressure regulator. With reference to FIG. 15A, a pressure regulator 500 comprises a diaphragm 504, which partitions a region within a casing 501 into a pressure regulating chamber 502 and an atmospheric chamber 503. The pressure regulator 500 also comprises a gas introducing port 505, through which a high-pressure gas having a pressure before being regulated is introduced into the pressure regulator 500. The pressure regulator 500 further comprises a regulating valve 506, which is interlocked with the diaphragm 504. The regulating valve 506 opens and closes an aperture 506c, through which the gas introducing port 505 and the pressure regulating chamber 502 communicate with each other. The regulating valve 506 performs the operations for opening and closing the aperture 506c from the unregulated pressure side and thereby reduces and regulates the unregulated pressure to the regulated pressure. The pressure regulator 500 still further comprises a gas discharging port 508, through which the gas having the regulated pressure and having passed through the pressure regulating chamber 502 is discharged. The pressure regulator 500 also comprises a weight 509, which urges the diaphragm 504 toward the direction of opening of the regulating valve 506 and thereby sets the regulated pressure.

The pressure regulator 500 is based upon the detection of a pressure difference between the atmospheric pressure and the regulated pressure. Specifically, the force occurring from an area of the diaphragm 504 and the pressure difference between the atmospheric pressure and the regulated pressure acts toward the direction of closing of the regulating valve 506, and the gravity of the weight 509 acts toward the direction of opening of the regulating valve 506. In a state in which the force occurring from the area of the diaphragm 504 and the pressure difference between the atmospheric pressure and the regulated pressure and the gravity of the weight 509 are balanced with each other, the regulated pressure is kept at the set pressure. In cases where the pressure on the gas discharging side, i.e. the regulated pressure in the pressure regulating chamber 502, is higher than the set pressure, the diaphragm 504 is displaced toward the side of the atmospheric chamber 503, and the regulating valve 506 is operated in the direction that closes the aperture 506c. In cases where the regulated pressure in the pressure regulating chamber 502 is lower than the set pressure, the diaphragm 504 is displaced toward the side of the pressure regulating chamber 502, and the regulating valve 506 is operated in the direction that opens the aperture 506c. More specifically, the motion of the diaphragm 504 occurring from the detection of the aforesaid pressure difference between the atmospheric pressure and the regulated pressure is transmitted to the regulating valve 506, which is located on the gas introducing side, and the regulated pressure is kept at the predetermined pressure through the pressure regulation performed with the opening and closing operations of the regulating valve 506.

However, in the cases of the single-valve type pressure regulator 500 described above, a pressure loss occurs due to the gas stream flowing through the regulating valve 506, and the force that displaces the diaphragm 504 toward the side of the atmospheric chamber 503, i.e. the force acting in the direction that closes the regulating valve 506, arises excessively from the value of the pressure loss described above and the area of the regulating valve 506. As described above, the regulating valve 506 performs the operations for opening and closing the aperture 506c from the unregulated pressure side. Therefore, in cases where the unregulated pressure becomes high, the aforesaid excessive force acting in the direction that closes the regulating valve 506 becomes large. Accordingly, the problems occur in that, as the unregulated pressure becomes high, the regulated pressure becomes low little by little, and the gas stream is ceased with the passage of time.

FIG. 15B is a schematic view showing a duplex-valve type pressure regulator. With reference to FIG. 15B, a pressure regulator 600 comprises a diaphragm 604, which partitions a region within a casing 601 into a pressure regulating chamber 602 and an atmospheric chamber 603. The pressure regulator 600 also comprises a gas introducing port 605, through which a high-pressure gas having a pressure before being regulated is introduced into the pressure regulator 600. The pressure regulator 600 further comprises two regulating valves 606 and 607, which are interlocked with the diaphragm 604. The regulating valves 606 and 607 respectively open and close two apertures 606c and 607c, through which the gas introducing port 605 and the pressure regulating chamber 602 communicate with each other. The regulating valves 606 and 607 thus reduce and regulate the unregulated pressure to the regulated pressure. The pressure regulator 600 still further comprises a gas discharging port 608, through which the gas having the regulated pressure and having passed through the pressure regulating chamber 602 is discharged. The pressure regulator 600 also comprises a weight 609, which urges the diaphragm 604 toward the direction of opening of the regulating valve 606 and thereby sets the regulated pressure.

The two regulating valves 606 and 607 described above are located such that the regulating valve 606 performs the operations for opening and closing the aperture 606c, which communicates with the pressure regulating chamber 602, from the unregulated pressure side, and such that the regulating valve 607 performs the operations for opening and closing the aperture 607c from the regulated pressure side. Therefore, with the duplex-valve type pressure regulator 600, the force due to the pressure loss occurring at the regulating valve 606 and the force due to the pressure loss occurring at the regulating valve 607 act in reverse directions and cancel each other. Accordingly, the drop of the regulated pressure accompanying the increase in the unregulated pressure is capable of being compensated for, and the regulated pressure is capable of being kept at a predetermined pressure.

As described above, the duplex-valve type pressure regulator 600 has good performance. However, the duplex-valve type pressure regulator 600 has the problems in that the two regulating valves 606 and 607 cannot always be located appropriately. Even if the two regulating valves 606 and 607 are capable of being located such that the regulating valves 606 and 607 simultaneously come into contact with their valve seats, the pressure loss of the gas stream passing through the regulating valve 606 and the pressure loss of the gas stream passing through the regulating valve 607 cannot always be equal to each other. Therefore, it is not always possible to constitute the duplex-valve type pressure regulator 600 such that the force exerted by the unregulated pressure upon the regulating valve 606 and the force exerted by the unregulated pressure upon the regulating valve 607 are perfectly canceled with each other.

FIG. 15C is a schematic view showing a modified duplex-valve type pressure regulator. With reference to FIG. 15C, a pressure regulator 700 comprises a diaphragm 704, which partitions a region within a casing 701 into a pressure regulating chamber 702 and an atmospheric chamber 703. The pressure regulator 700 also comprises a gas introducing port 705, through which a high-pressure gas having a pressure before being regulated is introduced into the pressure regulator 700. The pressure regulator 700 further comprises a regulating valve 706, which is interlocked with the diaphragm 704. The regulating valve 706 opens and closes an aperture 706c, through which the gas introducing port 705 and the pressure regulating chamber 702 communicate with each other. The regulating valve 706 thus reduces and regulates the unregulated pressure to the regulated pressure. The pressure regulator 700 still further comprises a regulating member 707, which is constituted of an O-ring and undergoes sliding movement together with the regulating valve 706. The pressure regulator 700 also comprises a gas discharging port 708, through which the gas having the regulated pressure and having passed through the pressure regulating chamber 702 is discharged. The pressure regulator 700 further comprises a weight 709, which urges the diaphragm 704 toward the direction of opening of the regulating valve 706 and thereby sets the regulated pressure.

The regulating valve 706 performs the operations for opening and closing the aperture 706c, which communicates with the pressure regulating chamber 702, from the unregulated pressure side. The unregulated pressure coming from the gas introducing port 705 acts upon one surface of the regulating member 707, which is constituted of the O-ring. Also, the regulated pressure, which comes from the pressure regulating chamber 702 through an intra-plunger gas flow path 710, acts upon the other surface of the regulating member 707. The force due to the pressure difference between the unregulated pressure, which acts upon the one surface of the regulating member 707, and the regulated pressure, which acts upon the other surface of the regulating member 707, is exerted upon the regulating member 707. The force, which is thus exerted upon the regulating member 707, cancels the force occurring from the value of the pressure loss, which arises at the regulating valve 706, and the area of the regulating valve 706. Therefore, even if the unregulated pressure becomes high, the regulated pressure is capable of being kept at the predetermined pressure. With the modified duplex-valve type pressure regulator 700, the regulating member 707 (corresponding to the regulating valve 607 of the duplex-valve type pressure regulator 600 shown in FIG. 15B) is constituted of the O-ring capable of undergoing the sliding movement, and the problems with regard to the location of the two regulating valves 606 and 607 of the duplex-valve type pressure regulator 600 shown in FIG. 15B are thereby solved.

[Patent Literature 1]

Japanese Unexamined Patent Publication No. 8(1996)-303773

As described above, the single-valve type pressure regulator has a simple structure, but has the problems in that the regulated pressure cannot always be obtained accurately with respect to a wide unregulated pressure range. In order for the regulated pressure to be obtained with respect to a wide unregulated pressure range by use of the single-valve type pressure regulator, it is necessary that a plurality of the single-valve type pressure regulators are utilized in order to reduce the unregulated pressure little by little from the high pressure to an intermediate pressure and from the intermediate pressure to a low pressure. However, in such cases, the advantages of the single-valve type pressure regulator with regard to the simple structure is lost. Also, in cases where the plurality of the single-valve type pressure regulators are connected to one another, it is necessary that the load for pressure regulation in the pressure regulator located on the upstream side, i.e. the pressure regulator for the high pressure, is set to be large. However, in such cases, follow-up characteristics with respect to marked fluctuations in pressure cannot be kept good.

The duplex-valve type pressure regulator described above theoretically has good performance. However, the duplex-valve type pressure regulator has the problems in that the two regulating valves cannot always be located appropriately, and therefore the duplex-valve type pressure regulator cannot always be used in practice.

The modified duplex-valve type pressure regulator described above has practicality, but has the problems described below. Specifically, since the value of the pressure loss occurring at the regulating valve varies in accordance with the gas flow rate, it is substantially impossible to cancel the force, which is exerted upon the regulating valve, by the force, which is exerted upon the regulating member constituted of the O-ring. Therefore, an error in regulated pressure occurs in accordance with the variation unregulated pressure. Also, since the regulating member (i.e., the O-ring) undergoes the sliding movement in accordance with the variation in unregulated pressure, the frictional resistance at the part of the regulating member is high. Therefore, the problems occur in that the response characteristics of the control of the regulated pressure with respect to the variation in unregulated pressure cannot be kept good. As a result, the pressure regulation with respect to the marked variation in unregulated pressure cannot be kept quick, and the fluctuation in regulated pressure becomes large. In order to cope with the problems described above, ordinarily, a lubricant is imparted to the O-ring sliding section. However, in cases where a gas having high dissolving characteristics is introduced into the modified duplex-valve type pressure regulator, the lubricant is attached by the gas, and the response characteristics of the control of the regulated pressure with respect to the variation in unregulated pressure quickly become bad. Therefore, the use of the lubricant is applicable only to the cases where an inert gas is introduced into the modified duplex-valve type pressure regulator.

Also, in cases where the pressure of the high-pressure gas is reduced and regulated with the pressure regulator provided with the diaphragm, it is desired that the pressure regulation to the regulated pressure having been set is capable of being performed accurately with respect to a wide unregulated pressure range. However, in cases where the regulated pressure is set by the alteration of the pressure regulating load applied to the diaphragm, if the difference between the highest pressure of the unregulated pressure and the set pressure of the regulated pressure is large, the problems will occur in that the accuracy with which the pressure is regulated becomes low.

Specifically, in cases where the degree of pressure reduction with one regulating valve is high, the pressure fluctuation with respect to the fluctuation in degree of opening of the regulating valve becomes large. Therefore, the operation accuracy of the regulating valve and the production accuracy of the valve structure largely affect the accuracy with which the pressure is regulated. However, it is not always possible to obtain a high operation accuracy of the regulating valve and a high production accuracy of the valve structure.

In view of the above circumstances, in one aspect of the present invention, as will be described later, two stages of governor means, i.e. a first-stage governor means comprising a diaphragm and a regulating valve and a second-stage governor means comprising a diaphragm and a regulating valve, are utilized, and the pressure regulation is performed in two stages in order for the pressure regulation accuracy to be enhanced. However, if two stages of governor means are merely located in parallel, the problems will occur in that the size of the pressure regulator cannot be kept small.

Further, actually, the regulating valve performs the pressure reduction with a very narrow valve space. Therefore, ordinarily, at least either one of the valve body and the valve seat of the regulating valve is made from an elastic body, such as a rubber material. However, in such cases, the problems occur in that various kinds of gases other than inert gases cause the elastic body to swell to a certain extent and to suffer from a variation in volume. The variation in volume of the elastic body arises principally in the directions of opening and closing operations of the regulating valve. Therefore, the valve space between the valve body and the valve seat becomes small with the passage of time of use, and the regulated pressure becomes low. In particular, in cases where a gas having high dissolving characteristics, such as a dimethyl ether gas, is introduced into the pressure regulator, it often occurs that the gas flow ceases within several tens of minutes.

Furthermore, in cases where a general-purpose synthetic resin is utilized as the material for a member constituting the pressure regulator, the problems described below occur. Specifically, when the member constituted of a certain kind of a general-purpose synthetic resin is brought into contact with the gas having the high dissolving characteristics, such as a dimethyl ether gas, for a long period of time, gas permeability, corrosion, cracks, and the like, occur with the member, and the member becomes not usable any more.

It is expected that dimethyl ether is usable as a substitute for a liquefied petroleum gas, a fuel for solid oxide type fuel cells (SOFC's), and a fuel for solid polymer type fuel cells (PEFC's). However, dimethyl ether exhibits a large variation in vapor pressure with respect to temperature. For example, in cases where the temperature of the use environment of at most 80° C. is taken into consideration, the vapor pressure of dimethyl ether rises to as high as 2,000 kPa. In cases where the pressure regulation is to be performed with respect to the dimethyl ether gas, it is necessary that the pressure reduction and the pressure regulation are capable of being performed sufficiently with respect to the wide pressure range described above, and that the pressure regulator has a structure resistant to the dissolving characteristics of the dimethyl ether gas.

SUMMARY OF THE INVENTION

The primary object of the present invention is to provide a pressure regulator, wherein a mechanism for performing pressure regulation for obtaining a predetermined regulated pressure regardless of fluctuation in unregulated pressure of a high-pressure gas, particularly such that the unregulated pressure falling within a wide unregulated pressure range from a low pressure to a high pressure is capable of being regulated accurately to the predetermined regulated pressure, is constituted of a small-sized, simple structure.

Another object of the present invention is to provide a pressure regulator, wherein a mechanism for performing pressure regulation for obtaining a predetermined regulated pressure regardless of fluctuation in unregulated pressure of a high-pressure gas, particularly such that the unregulated pressure falling within a wide unregulated pressure range from a low pressure to a high pressure is capable of being regulated accurately to the predetermined regulated pressure, and such that a sufficiently high follow-up speed is capable of being obtained with respect to a marked fluctuation in unregulated pressure of the high-pressure gas, is constituted of a small-sized, simple structure.

The specific object of the present invention is to provide a pressure regulator, which is capable of being used for a long period of time for regulation of pressure of a gas having high dissolving characteristics, such as a dimethyl ether gas.

The present invention provides a first pressure regulator, comprising:

i) a gas introducing port, through which a high-pressure gas having an unregulated pressure is introduced into the pressure regulator, ii) a main regulating valve, which reduces the unregulated pressure of the high-pressure gas to a regulated pressure, a pressure loss occurring at the main regulating valve, iii) a pressure regulating chamber for relaxing pressure vibration of the gas, which has passed through the main regulating valve, iv) a diaphragm, which partitions off the pressure regulating chamber and an atmospheric chamber from each other, and which receives the regulated pressure within the pressure regulating chamber and is thereby displaced, v) a plunger, which interlocks the diaphragm and the main regulating valve with each other, vi) a pressure setting section for adjusting a quantity of the displacement of the diaphragm, vii) a gas discharging port, through which the gas having the regulated pressure is discharged from the pressure regulator, viii) a subsidiary regulating valve, which operates by being interlocked with the main regulating valve through the plunger and which reduces the unregulated pressure of the high-pressure gas to the regulated pressure, a pressure loss occurring at the subsidiary regulating valve, the subsidiary regulating valve being located such that the force, which accompanies the pressure loss occurring at the subsidiary regulating valve and which the subsidiary regulating valve receives, cancels the force, which accompanies the pressure loss occurring at the main regulating valve and which acts upon the plunger, and ix) adjustment means, which is capable of adjusting a value of the pressure loss occurring at the subsidiary regulating valve, the adjustment means being adjusted such that the value of the pressure loss, which the main regulating valve receives, and the value of the pressure loss, which the subsidiary regulating valve receives, become equal to each other.

The first pressure regulator in accordance with the present invention should preferably be modified such that a valve body of the main regulating valve and a valve body of the subsidiary regulating valve are located on the plunger, one of the two valve bodies is located on the unregulated pressure side, and the other valve body is located on the regulated pressure side.

Also, the first pressure regulator in accordance with the present invention should preferably be modified such that the adjustment means is capable of adjusting the value of the pressure loss, which occurs at the subsidiary regulating valve, with an operation for varying a position of a valve seat of the subsidiary regulating valve with respect to a movement of the plunger.

Further, the first pressure regulator in accordance with the present invention should preferably be modified such that the adjustment means is constituted of a duplex-valve adjustor provided with:

an aperture region, which is fitted for sliding movement onto a part of the plunger, the part being located between the valve body of the main regulating valve and the valve body of the subsidiary regulating valve, and the valve seat of the subsidiary regulating valve.

In such cases, the first pressure regulator in accordance with the present invention should preferably be modified such that the gas discharging port is formed through the duplex-valve adjustor. Also, the first pressure regulator in accordance with the present invention should preferably be modified such that the gas having the regulated pressure within the pressure regulating chamber passes through a secondary gas flow path extending through a center area of the plunger and thus communicates with the gas discharging port.

Furthermore, the first pressure regulator in accordance with the present invention should preferably be modified such that the pressure regulator further comprises a valve closing spring, which urges the plunger toward a direction of closing of the main regulating valve.

Also, the first pressure regulator in accordance with the present invention should preferably be modified such that either one of the valve body and the valve seat of the main regulating valve comprises an elastic body, either one of the valve body and the valve seat of the subsidiary regulating valve comprises an elastic body, and each of the elastic body of the main regulating valve and the elastic body of the subsidiary regulating valve is located in a state in which the elastic body is controlled such that the elastic body is prevented from deforming with respect to directions of valve opening and closing movements.

Further, the first pressure regulator in accordance with the present invention should preferably modified such that each of the elastic body of the main regulating valve and the elastic body of the subsidiary regulating valve is constituted of an O-ring.

The present invention also provides a second pressure regulator, comprising:

i) a gas introducing port, through which a high-pressure gas having an unregulated pressure is introduced into the pressure regulator, ii) a main regulating valve, which performs gas pressure reduction to a regulated pressure, a pressure loss occurring at the main regulating valve, iii) a pressure regulating chamber for relaxing pressure vibration of the gas, which has passed through the main regulating valve, iv) a diaphragm, which partitions off the pressure regulating chamber and an atmospheric chamber from each other, and which receives the regulated pressure within the pressure regulating chamber and is thereby displaced, v) a plunger, which interlocks the diaphragm and the main regulating valve with each other, vi) a pressure setting section for adjusting a quantity of the displacement of the diaphragm, vii) a gas discharging port, through which the gas having the regulated pressure is discharged from the pressure regulator, and viii) a preliminary regulating valve, which operates by being interlocked with the main regulating valve through the plunger and which reduces the unregulated pressure of the high-pressure gas from the gas introducing port at a stage prior to the main regulating valve, a pressure loss occurring at the preliminary regulating valve, the gas, which has a pressure having thus been reduced by the preliminary regulating valve, being allowed to flow to the main regulating valve.

The second pressure regulator in accordance with the present invention should preferably be modified such that a valve body of the main regulating valve and a valve body of the preliminary regulating valve are located on the plunger, and the valve body of the preliminary regulating valve is located on the gas introducing port side.

Also, the second pressure regulator in accordance with the present invention should preferably be modified such that the pressure regulator further comprises adjustment means, which is capable of adjusting a value of the pressure loss occurring at the preliminary regulating valve. Further, the second pressure regulator in accordance with the present invention should preferably be modified such that the adjustment means is capable of adjusting the value of the pressure loss, which occurs at the preliminary regulating valve, with an operation for varying a position of a valve seat of the preliminary regulating valve with respect to a movement of the plunger.

Furthermore, the second pressure regulator in accordance with the present invention should preferably be modified such that the adjustment means is constituted of an adjustor provided with:

an aperture region, which is fitted for sliding movement onto a part of the plunger, the part being located between the valve body of the main regulating valve and the valve body of the preliminary regulating valve, and the valve seat of the preliminary regulating valve.

In such cases, the second pressure regulator in accordance with the present invention should preferably be modified such that the gas introducing port is formed through the adjustor.

Also, the second pressure regulator in accordance with the present invention should preferably be modified such that either one of the valve body and the valve seat of the main regulating valve comprises an elastic body, either one of the valve body and the valve seat of the preliminary regulating valve comprises an elastic body, and each of the elastic body of the main regulating valve and the elastic body of the preliminary regulating valve is located in a state in which the elastic body is controlled such that a direction of swelling deformation of the elastic body becomes different from directions of valve opening and closing operations.

Further, the second pressure regulator in accordance with the present invention should preferably be modified such that each of the elastic body of the main regulating valve and the elastic body of the preliminary regulating valve is constituted of an O-ring.

Each of the plunger, which links the main regulating valve and the preliminary regulating valve with the diaphragm, and a supporter, which receives a pressure setting load acting upon the diaphragm, should preferably be constituted of a light metal or a light metal alloy, such as aluminum or duralumin. Alternatively, each of the plunger and the supporter should preferably be constituted of a polyamide, a polyacetal, a polybutylene terephthalate, or a polypropylene, which is a crystalline resin. As another alternative, each of the plunger and the supporter should preferably be constituted of an acetal, a polycarbonate, or acrylonitrile-butadiene-styrene, which is a non-crystalline resin, the non-crystalline resin having a surface coated with an epoxy resin or a polyamide resin.

Also, a casing in which the diaphragm is located should preferably be constituted of a polyamide, a polyacetal, a polybutylene terephthalate, or a polypropylene, which is a crystalline resin. Alternatively, the casing in which the diaphragm is located should preferably be constituted of an acetal, a polycarbonate, or acrylonitrile-butadiene-styrene, which is a non-crystalline resin, the non-crystalline resin having a surface coated with an epoxy resin or a polyamide resin.

The epoxy resin described above should preferably contain a polyphenol and epourea as principal constituents.

Also, the casing in which the diaphragm is located should preferably be constituted of a polyamide, a polyacetal, a polybutylene terephthalate, or a polypropylene, which is a crystalline resin, and the casing should preferably be formed with ultrasonic fusion bonding.

The present invention further provides a third pressure regulator, comprising:

i) a first-stage governor system, which is provided with a first regulating valve for reducing an unregulated pressure of an introduced gas to an intermediate pressure, and ii) a second-stage governor system, which is provided with a second regulating valve for reducing the intermediate pressure to a regulated pressure, the first-stage governor system and the second-stage governor system being located such that a direction of displacement of a first diaphragm of the first-stage governor system, which first diaphragm operates the first regulating valve of the first-stage governor system, and the direction of the displacement of a second diaphragm of the second-stage governor system, which second diaphragm operates the second regulating valve of the second-stage governor system, intersect with each other.

The third pressure regulator in accordance with the present invention should preferably be modified such that the first-stage governor system comprises:

a) a gas introducing port, through which a high-pressure gas having the unregulated pressure is introduced into the pressure regulator, b) the first regulating valve, which reduces the unregulated pressure of the high-pressure gas within the gas introducing port to the intermediate pressure, c) a first pressure regulating chamber for relaxing pressure vibration of the gas, which has passed through the first regulating valve, d) the first diaphragm, which partitions off the first pressure regulating chamber and an atmospheric chamber from each other, and which receives the intermediate pressure within the first pressure regulating chamber and is thereby displaced, e) a first plunger, whose one end is secured to the first diaphragm, a valve body of the first regulating valve being fitted to a region of the first plunger, which region is located in the vicinity of the other end of the first plunger, and f) a first pressure setting section for adjusting a quantity of the displacement of the first diaphragm, and the second-stage governor system comprises:

a) the second regulating valve for reducing the intermediate pressure of the gas, which has been introduced from the first pressure regulating chamber, to the regulated pressure, b) a second pressure regulating chamber for relaxing pressure vibration of the gas, which has passed through the second regulating valve, c) the second diaphragm, which partitions off the second pressure regulating chamber and an atmospheric chamber from each other, and which receives the regulated pressure within the second pressure regulating chamber and is thereby displaced, d) a second plunger, whose one end is secured to the second diaphragm, a valve body of the second regulating valve being fitted to a region of the second plunger, which region is located in the vicinity of the other end of the second plunger, e) a second pressure setting section for adjusting a quantity of the displacement of the second diaphragm, and f) a gas discharging port, through which the gas having the regulated pressure is discharged from the pressure regulator, the first plunger and the second plunger being located such that the first plunger and the second plunger extend in directions which intersect at right angles with each other, a part of the second plunger being inserted for sliding movement into a gas flow path extending from the first pressure regulating chamber to the second pressure regulating chamber, the second regulating valve being located within the first pressure regulating chamber.

Also, the third pressure regulator in accordance with the present invention should preferably be modified such that a pressure receiving area of the first diaphragm of the first-stage governor system is smaller than the pressure receiving area of the second diaphragm of the second-stage governor system.

Further, the third pressure regulator in accordance with the present invention should preferably be modified such that either one of the valve body and a valve seat of the first regulating valve comprises an elastic body, either one of the valve body and a valve seat of the second regulating valve comprises an elastic body, and each of the elastic body of the first regulating valve and the elastic body of the second regulating valve is located in a state in which the elastic body is controlled such that a direction of swelling deformation of the elastic body becomes different from directions of valve opening and closing operations.

Furthermore, the third pressure regulator in accordance with the present invention should preferably be modified such that each of the elastic body of the first regulating valve and the elastic body of the second regulating valve is made from a urethane type rubber material. Also, the third pressure regulator in accordance with the present invention should preferably be modified such that each of the elastic body of the first regulating valve and the elastic body of the second regulating valve is constituted of an O-ring.

Each of the first plunger, which links the first regulating valve with the first diaphragm in the first-stage governor system, the second plunger, which links the second regulating valve with the second diaphragm in the second-stage governor system, a first supporter, which receives a pressure setting load acting upon the first diaphragm, and a second supporter, which receives a pressure setting load acting upon the second diaphragm, should preferably be constituted of a light metal or a light metal alloy, such as aluminum or duralumin. Alternatively, each of the first plunger, the second plunger, the first supporter, and the second supporter should preferably be constituted of a polyamide, a polyacetal, a polybutylene terephthalate, or a polypropylene, which is a crystalline resin. As another alternative, each of the first plunger, the second plunger, the first supporter, and the second supporter should preferably be constituted of an acetal, a polycarbonate, or acrylonitrile-butadiene-styrene, which is a non-crystalline resin, the non-crystalline resin having a surface coated with an epoxy resin or a polyamide resin.

Also, a casing, in which the first-stage governor system and the second-stage governor system are located, should preferably be constituted of a polyamide, a polyacetal, a polybutylene terephthalate, or a polypropylene, which is a crystalline resin. Alternatively, the casing, in which the first-stage governor system and the second-stage governor system are located, should preferably be constituted of an acetal, a polycarbonate, or acrylonitrile-butadiene-styrene, which is a non-crystalline resin, the non-crystalline resin having a surface coated with an epoxy resin or a polyamide resin.

The epoxy resin described above should preferably contain a polyphenol and epourea as principal constituents.

Also, the casing, in which the first-stage governor system and the second-stage governor system are located, should preferably be constituted of a polyamide, a polyacetal, a polybutylene terephthalate, or a polypropylene, which is a crystalline resin, and the casing should preferably be formed with ultrasonic fusion bonding.

The first, second, and third pressure regulators in accordance with the present invention is also applicable in cases where the high-pressure gas is a dimethyl ether gas, which is utilized as a substitute for a liquefied petroleum gas, a fuel for solid oxide type fuel cells (SOFC's), and a fuel for solid polymer type fuel cells (PEFC's).

The first pressure regulator in accordance with the present invention comprises the main regulating valve, which reduces the unregulated pressure of the high-pressure gas to the regulated pressure, the pressure loss occurring at the main regulating valve. The first pressure regulator in accordance with the present invention also comprises the plunger, which interlocks the main regulating valve and the diaphragm with each other. The first pressure regulator in accordance with the present invention further comprises the subsidiary regulating valve, which operates by being interlocked with the main regulating valve through the plunger, and which reduces the unregulated pressure of the high-pressure gas to the regulated pressure, the pressure loss occurring at the subsidiary regulating valve. The subsidiary regulating valve is located such that the force, which accompanies the pressure loss occurring at the subsidiary regulating valve and which the subsidiary regulating valve receives, cancels the force, which accompanies the pressure loss occurring at the main regulating valve and which acts upon the plunger. The value of the pressure loss occurring at the subsidiary regulating valve is adjusted by the adjustment means, such that the value of the pressure loss, which the main regulating valve receives, and the value of the pressure loss, which the subsidiary regulating valve receives, become equal to each other. Therefore, with the first pressure regulator in accordance with the present invention, the regulated pressure is capable of being obtained accurately with respect to a wide unregulated pressure range by use of the one pressure regulator. Also, with the first pressure regulator in accordance with the present invention, the location of the two regulating valves is easy to perform, and the constitution of the pressure regulator is capable of being kept simple. Further, in cases where the value of the pressure loss occurring from the main regulating valve varies in accordance with the gas flow rate, the force acting upon the main regulating valve is capable of being accurately canceled by the subsidiary regulating valve, and the regulated pressure is capable of being kept at the predetermined pressure regardless of the variation in unregulated pressure. Furthermore, in cases where the plunger moves with respect to the pressure variation, the resistance to the sliding movement of the plunger is low. Accordingly, the response characteristics of the control of the regulated pressure with respect to the variation in unregulated pressure is capable of being kept good, and the accuracy with which the pressure regulation is performed is capable of being kept high.

With the first pressure regulator in accordance with the present invention, wherein the pressure regulator further comprises the valve closing spring, which urges the plunger toward the direction of closing of the main regulating valve, in cases where the set pressure of the regulated pressure is low, the accurate operation of the main regulating valve in accordance with the displacement of the diaphragm is capable of being obtained, and reliable pressure regulation is capable of being performed. Also, a blocking state, in which the main regulating valve and the subsidiary regulating valve are closed, is capable of being obtained reliably.

The first pressure regulator in accordance with the present invention may be modified such that either one of the valve body and the valve seat of the main regulating valve comprises the elastic body, either one of the valve body and the valve seat of the subsidiary regulating valve comprises the elastic body, and each of the elastic body of the main regulating valve and the elastic body of the subsidiary regulating valve is located in the state in which the elastic body is controlled such that the elastic body is prevented from deforming with respect to the directions of the valve opening and closing movements. With the modification described above, in cases where the elastic body swells and undergoes a variation in volume, little variation in space between the valve body and the valve seat occurs with the passage of time of use. Therefore, in cases where the pressure regulator is utilized for regulating the pressure of a gas having high dissolving characteristics, such as a dimethyl ether gas, a variation in gas flow rate due to the swelling of the elastic body does not occur, and the performance of the pressure regulator is capable of being obtained.

The second pressure regulator in accordance with the present invention comprises the main regulating valve, which performs the gas pressure reduction to the regulated pressure, the pressure loss occurring at the main regulating valve. The second pressure regulator in accordance with the present invention also comprises the plunger, which interlocks the main regulating valve and the diaphragm with each other. The second pressure regulator in accordance with the present invention further comprises the preliminary regulating valve, which is located on the side upstream from the main regulating valve. The preliminary regulating valve operates by being interlocked with the main regulating valve through the plunger and reduces the unregulated pressure of the high-pressure gas coming from the gas introducing port, the pressure loss occurring at the preliminary regulating valve. Therefore, with the second pressure regulator in accordance with the present invention, in cases where the gas having a high pressure flows through the gas introducing port into the pressure regulator, the unregulated pressure is capable of being reduced by the preliminary regulating valve, and the pressure reduction and regulation to the regulated pressure is capable of being performed accurately by the main regulating valve. Accordingly, the follow-up characteristics with respect to fluctuation in unregulated pressure are capable of being kept good. Also, as the unregulated pressure becomes high, the pressure loss occurring at the preliminary regulating valve becomes large. Therefore, the load with respect to the main regulating valve is capable of being kept light. In cases where the unregulated pressure is low, the pressure loss occurring at the preliminary regulating valve is small, and therefore the second pressure regulator in accordance with the present invention is capable of operating in the same manner as that for the ordinary single-valve type pressure regulator.

With the second pressure regulator in accordance with the present invention, wherein the degree of the pressure loss occurring at the preliminary regulating valve is capable of being adjusted, the load of the main regulating valve is capable of being altered, and the accuracy with which the pressure regulation is performed is capable of being enhanced.

With the second pressure regulator in accordance with the present invention, wherein the valve body of the main regulating valve and the valve body of the preliminary regulating valve are located on the plunger, the load for the pressure regulation acting upon the two regulating valves is capable of being obtained with the same spring. Therefore, the response speed of the pressure regulator with respect to the marked fluctuation in unregulated pressure is capable of being kept sufficiently higher than, for example, the cases wherein a single-valve type pressure regulator for high pressures and a single-valve type pressure regulator for low pressures are connected in series and operated. Also, with the second pressure regulator in accordance with the present invention, wherein the valve body of the main regulating valve and the valve body of the preliminary regulating valve are located on the plunger, since only one set of the spring and the diaphragm is utilized, the structure of the pressure regulator is capable of being kept as simple as the structure of one unit of a single-valve type pressure regulator.

The second pressure regulator in accordance with the present invention may be modified such that either one of the valve body and the valve seat of the main regulating valve comprises the elastic body, either one of the valve body and the valve seat of the preliminary regulating valve comprises the elastic body, and each of the elastic body of the main regulating valve and the elastic body of the preliminary regulating valve is located in the state in which the elastic body is controlled such that the direction of the swelling deformation of the elastic body becomes different from the directions of the valve opening and closing operations. With the modification described above, in cases where the elastic body swells and undergoes a variation in volume, little variation in space between the valve body and the valve seat occurs with the passage of time of use. Therefore, in cases where the pressure regulator is utilized for regulating the pressure of a gas having high dissolving characteristics, such as a dimethyl ether gas, a variation in gas flow rate due to the swelling of the elastic body does not occur, and the performance of the pressure regulator is capable of being obtained.

Also, as described above, each of the plunger, which links the main regulating valve and the preliminary regulating valve with the diaphragm, and the supporter, which receives the pressure setting load acting upon the diaphragm, should preferably be constituted of a light metal or a light metal alloy, such as aluminum or duralumin. Alternatively, each of the plunger and the supporter should preferably be constituted of a polyamide, a polyacetal, a polybutylene terephthalate, or a polypropylene, which is a crystalline resin. As another alternative, each of the plunger and the supporter should preferably be constituted of an acetal, a polycarbonate, or acrylonitrile-butadiene-styrene, which is a non-crystalline resin, the non-crystalline resin having a surface coated with an epoxy resin or a polyamide resin. In cases where each of the members described above is constituted of one of the materials enumerated above, the members operating together with the diaphragm, to which the members described above are secured, are capable of being kept light in weight. Therefore, the response characteristics of the regulating valves with respect to the displacement of the diaphragm are capable of being enhanced. Also, by virtue of low inertia force, a chattering phenomenon is capable of being prevented from occurring. Further, the members are not affected by the dissolving characteristics of the dimethyl ether gas, or the like, and do not undergo corrosion or cracking.

Also, as described above, the casing in which the diaphragm is located should preferably be constituted of a polyamide, a polyacetal, a polybutylene terephthalate, or a polypropylene, which is a crystalline resin.

Alternatively, the casing in which the diaphragm is located should preferably be constituted of an acetal, a polycarbonate, or acrylonitrile-butadiene-styrene, which is a non-crystalline resin, the non-crystalline resin having a surface coated with an epoxy resin or a polyamide resin. In cases where the casing is constituted of one of the materials enumerated above, by virtue of the utilization of the resin, the casing is capable of being kept light in weight and low in cost. Also, since the casing is capable of being formed with the ultrasonic bonding, the operation for assembling the casing is capable of being performed easily. Further, the casing is not affected by the dissolving characteristics of the dimethyl ether gas, or the like, and do not undergo corrosion or cracking.

Particularly, in the cases of pressure regulators for stabilization of fuel supply to solid oxide type fuel cells (SOFC's) and solid polymer type fuel cells (PEFC's), it is markedly undesirable that metal ions are present in the dimethyl ether gas supplied as the fuel. However, with the second pressure regulator in accordance with the present invention, wherein the members described above are constituted of the resins, the problems are capable of being prevented from occurring in that the metal ions are dissolved out into the dimethyl ether gas supplied as the fuel.

With the third pressure regulator, which comprises the two governor systems, the unregulated pressure of the high-pressure gas is capable of being reduced in two stages to the regulated pressure. Therefore, with one pressure regulator, the regulated pressure having been reduced to the set pressure is capable of being obtained accurately with respect to a wide unregulated pressure range, and the accuracy with which the pressure regulation is performed is capable of being enhanced. Also, since the two governor systems are located such that the directions of displacement of the two diaphragms intersect with each other, the size of the pressure regulator is capable of being kept small.

The third pressure regulator in accordance with the present invention may be modified such that the first plunger and the second plunger are located such that the first plunger and the second plunger extend in directions which intersect at right angles with each other, a part of the second plunger is inserted for sliding movement into the gas flow path extending from the first pressure regulating chamber to the second pressure regulating chamber, and the second regulating valve is located within the first pressure regulating chamber. With the modification described above, the inside structure of the pressure regulator is capable of being kept simple. Therefore, the modification described above is advantageous from the view point of production and cost.

With the third pressure regulator in accordance with the present invention, wherein the pressure receiving area of the first diaphragm of the first-stage governor system is smaller than the pressure receiving area of the second diaphragm of the second-stage governor system, the regulation accuracy of the regulated pressure is capable of being obtained reliably with the second diaphragm having the large pressure receiving area, and the size of the entire pressure regulator is capable of being kept small by virtue of the reduction of the size of the first diaphragm.

The third pressure regulator in accordance with the present invention may be modified such that either one of the valve body and the valve seat of the first regulating valve comprises the elastic body, either one of the valve body and the valve seat of the second regulating valve comprises the elastic body, and each of the elastic body of the first regulating valve and the elastic body of the second regulating valve is located in the state in which the elastic body is controlled such that the direction of the swelling deformation of the elastic body becomes different from the directions of valve opening and closing operations. With the modification described above, in cases where the elastic body swells and undergoes a variation in volume, little variation in space between the valve body and the valve seat occurs with the passage of time of use. Therefore, in cases where the pressure regulator is utilized for regulating the pressure of a gas having high dissolving characteristics, such as a dimethyl ether gas, a variation in gas flow rate due to the swelling of the elastic body does not occur, and the performance of the pressure regulator is capable of being obtained. In particular, in cases where each of the elastic body of the first regulating valve and the elastic body of the second regulating valve is made from the urethane type rubber material, the elastic body is capable of being kept more resistant to the adverse effects of the gas having the high dissolving characteristics.

Also, as described above, each of the first plunger, which links the first regulating valve with the first diaphragm in the first-stage governor system, the second plunger, which links the second regulating valve with the second diaphragm in the second-stage governor system, the first supporter, which receives the pressure setting load acting upon the first diaphragm, and the second supporter, which receives the pressure setting load acting upon the second diaphragm, should preferably be constituted of a light metal or a light metal alloy, such as aluminum or duralumin. Alternatively, each of the first plunger, the second plunger, the first supporter, and the second supporter should preferably be constituted of a polyamide, a polyacetal, a polybutylene terephthalate, or a polypropylene, which is a crystalline resin. As another alternative, each of the first plunger, the second plunger, the first supporter, and the second supporter should preferably be constituted of an acetal, a polycarbonate, or acrylonitrile-butadiene-styrene, which is a non-crystalline resin, the non-crystalline resin having a surface coated with an epoxy resin or a polyamide resin. In cases where each of the members described above is constituted of one of the materials enumerated above, the members operating together with each of the diaphragms, to which the members described above are secured, are capable of being kept light in weight. Therefore, the response characteristics of the regulating valves with respect to the displacement of the diaphragms are capable of being enhanced. Also, by virtue of low inertia force, a chattering phenomenon is capable of being prevented from occurring. Further, the members are not affected by the dissolving characteristics of the dimethyl ether gas, or the like, and do not undergo corrosion or cracking.

Also, as described above, the casing, in which the first-stage governor system and the second-stage governor system are located, should preferably be constituted of a polyamide, a polyacetal, a polybutylene terephthalate, or a polypropylene, which is a crystalline resin. Alternatively, the casing, in which the first-stage governor system and the second-stage governor system are located, should preferably be constituted of an acetal, a polycarbonate, or acrylonitrile-butadiene-styrene, which is a non-crystalline resin, the non-crystalline resin having a surface coated with an epoxy resin or a polyamide resin. In cases where the casing is constituted of one of the materials enumerated above, by virtue of the utilization of the resin, the casing is capable of being kept light in weight and low in cost. Also, since the casing is capable of being formed with the ultrasonic bonding, the operation for assembling the casing is capable of being performed easily. Further, the casing is not affected by the dissolving characteristics of the dimethyl ether gas, or the like, and do not undergo corrosion or cracking.

Particularly, in the cases of pressure regulators for stabilization of fuel supply to solid oxide type fuel cells (SOFC's) and solid polymer type fuel cells (PEFC's), it is markedly undesirable that metal ions are present in the dimethyl ether gas supplied as the fuel. However, with the third pressure regulator in accordance with the present invention, wherein the members described above are constituted of the resins, the problems are capable of being prevented from occurring in that the metal ions are dissolved out into the dimethyl ether gas supplied as the fuel.

DESCRIPTION OF THE PREFERRED EMBODIMENTS

The present invention will hereinbelow be described in further detail with reference to the accompanying drawings.

Figure 1:
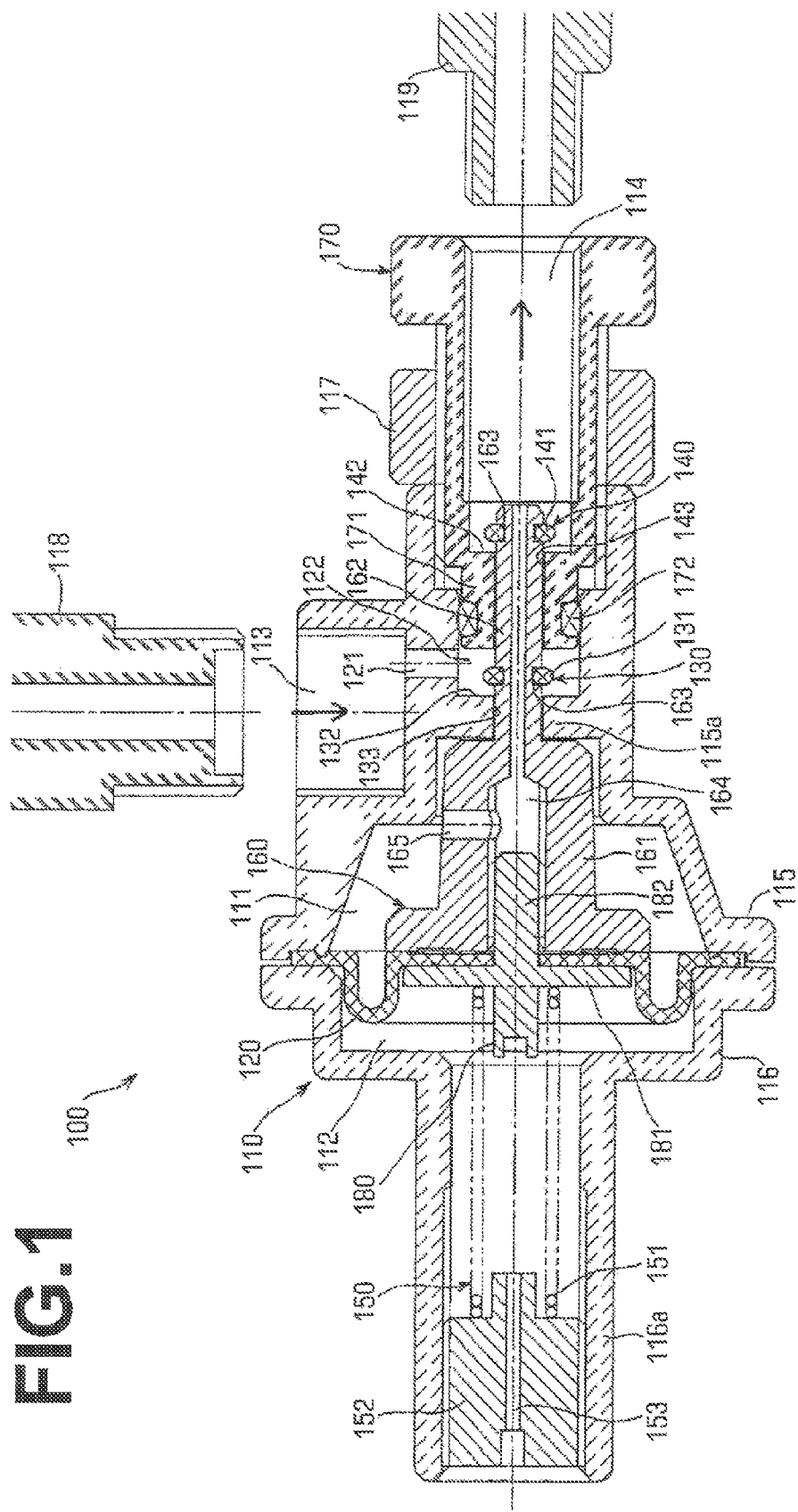
FIG. 1 is a sectional view showing a first embodiment of the pressure regulator in accordance with the present invention.

FIG. 1 is a sectional view showing a first embodiment of the pressure regulator in accordance with the present invention.

With reference to FIG. 1, a pressure regulator 100, which is the first embodiment of the pressure regulator in accordance with the present invention, comprises a diaphragm 120, which partitions off a region within a casing 110 into a pressure regulating chamber 111 and an atmospheric chamber 112. The pressure regulator 100 also comprises a gas introducing port 113, through which a high-pressure gas having an unregulated pressure is introduced into the pressure regulator 100. The pressure regulator 100 further comprises a main regulating valve 130, which operates by being interlocked with the diaphragm 120. The main regulating valve 130 performs operations for opening and closing an aperture 133, through which the gas introducing port 113 and the pressure regulating chamber 111 communicate with each other. The operations of the main regulating valve 130 for opening and closing the aperture 133 are performed from the unregulated pressure side. The main regulating valve 130 thus reduces the unregulated pressure of the high-pressure gas to a regulated pressure. The pressure regulator 100 still further comprises a subsidiary regulating valve 140, which operates by being interlocked with the diaphragm 120. The subsidiary regulating valve 140 performs operations for opening and closing an aperture 143, through which the gas introducing port 113 and the pressure regulating chamber 111 communicate with each other. The operations of the subsidiary regulating valve 140 for opening and closing the aperture 143 are performed from the regulated pressure side. The pressure regulator 100 also comprises a gas discharging port 114, through which the gas having been pressure-regulated through the pressure regulating chamber 111 and having the regulated pressure is discharged from the pressure regulator 100. The pressure regulator 100 further comprises a pressure setting section 150 for adjusting a quantity of displacement of the diaphragm 120, which receives the regulated pressure within the pressure regulating chamber 111 and is thereby displaced. The diaphragm 120, the main regulating valve 130, and the subsidiary regulating valve 140 are linked and interlocked with one another by a plunger 160. The pressure regulator 100 still further comprises a duplex-valve adjustor 170, which acts as the adjustment means for adjusting the position of a valve seat of the subsidiary regulating valve 140 and thereby adjusting a value of a pressure loss, which occurs at the subsidiary regulating valve 140.

Each of the main regulating valve 130 and the subsidiary regulating valve 140 reduces the unregulated pressure of the high-pressure gas to the regulated pressure, a pressure loss occurring at each of the main regulating valve 130 and the subsidiary regulating valve 140. The main regulating valve 130 and the subsidiary regulating valve 140 are located such that the force, which acts upon the main regulating valve 130 due to the pressure loss occurring at the main regulating valve 130, and the force, which acts upon the subsidiary regulating valve 140 due to the pressure loss occurring at the subsidiary regulating valve 140, cancel each other. With the duplex-valve adjustor (adjustment means) 170, the value of the pressure loss, which the subsidiary regulating valve 140 receives, is capable of being adjusted such that the value of the pressure loss becomes equal to the value of the pressure loss, which the main regulating valve 130 receives.

Also, each of a valve body 131 of the main regulating valve 130 and a valve body 141 of the subsidiary regulating valve 140 is constituted of an elastic body, which is formed as an O-ring. Each of the elastic body of the main regulating valve 130 and the elastic body of the subsidiary regulating valve 140 is located in a state in which the elastic body is controlled by a peripheral groove section 163 such that the elastic body is prevented from deforming with respect to directions of valve opening and closing movements. Therefore, a dimethyl ether gas, or the like, which will have adverse effects, such as swelling effects, upon the elastic body, is capable of being used as the high-pressure gas.

The structure of the pressure regulator 100 will hereinbelow be described in more detail.

The casing 110 comprises a casing main body section 115 and a cover section 116. The casing main body section 115 and the cover section 116 are joined to each other with the diaphragm 120 intervening therebetween. In this manner, the space within the casing 110 is partitioned off by the diaphragm 120 into the pressure regulating chamber 111, which is located on the side of the casing main body section 115, and the atmospheric chamber 112, which is located on the side of the cover section 116. The pressure regulating chamber 111 has a certain volume and is capable of relaxing pressure vibration of the gas, which has passed through the main regulating valve 130.

The diaphragm 120 receives the regulated pressure within the pressure regulating chamber 111 and is thus capable of undergoing elastic displacement in accordance with the difference in pressure between the pressure regulating chamber 111 and the atmospheric chamber 112. On the side of the casing main body section 115, the plunger 160 is secured to a center region of the diaphragm 120. Also, on the side of the cover section 116, a supporter 180 is secured to the center region of the diaphragm 120. The plunger 160 and the supporter 180 are capable of moving together in the axial direction of the plunger 160 and the supporter 180 in accordance with the displacement of the diaphragm 120.

The plunger 160 comprises a trunk section 161, which is secured to the diaphragm 120 and located within the pressure regulating chamber 111, and a shaft section 162, which extends in the axial direction of the plunger 160 from an end of the trunk section 161. The shaft section 162 is provided with two peripheral groove sections 163, 163, which are located at a predetermined spacing from each other. The valve body 131 of the main regulating valve 130, which valve body is constituted of the O-ring (i.e., the elastic body), is fitted into one of the peripheral groove sections 163, 163. Also, the valve body 141 of the subsidiary regulating valve 140, which valve body is constituted of the O-ring (i.e., the elastic body), is fitted into the other peripheral groove section 163. A secondary gas flow path 164 is formed through the center areas of the trunk section 161 and the shaft section 162 of the plunger 160, such that the secondary gas flow path 164 extends from one end of the plunger 160 to the other end of the plunger 160. A side wall of the trunk section 161 has a communication aperture 165, through which the pressure regulating chamber 111 and the secondary gas flow path 164 communicate with each other.

The supporter 180 is provided with a bolt section 182, which continues from a center area of a flange section 181 located in close contact with the diaphragm 120. The bolt section 182 of the supporter 180 passes through the center area of the diaphragm 120 and is engaged with a threaded end section of the secondary gas flow path 164 of the plunger 160, which is located on the side opposite to the flange section 181 of the supporter 180. The supporter 180 is thus linked to the plunger 160.

One end section of a pressure regulating spring 151 of the pressure setting section 150, which is located within a tubular section 116a of the cover section 116, is brought into abutment with the flange section 181 of the supporter 180. The other end section of the pressure regulating spring 151 is brought into abutment with a pressure regulating screw (adjustor) 152, which is engaged by threads with an inside wall of the tubular section 116a such that the position of the pressure regulating screw 152 is capable of being adjusted. The urging force of the pressure regulating spring 151 acting upon the diaphragm 120 is adjusted in accordance with the adjustment of the position of the pressure regulating screw 152 with respect to the axial direction of the tubular section 116a. A center area of the pressure regulating screw 152 has a communication through-hole 153, which passes through the center area of the pressure regulating screw 152 in the axial direction of the pressure regulating screw 152. Through the communication through-hole 153 of the pressure regulating screw 152, the atmospheric chamber 112 is open to the ambient atmosphere.

A side wall of the casing main body section 115 is provided with the gas introducing port 113, through which the high-pressure gas is introduced into the pressure regulator 100. A first connector 118 for introducing the high-pressure gas, such as the dimethyl ether gas, which has the unregulated pressure and is supplied from a gas cylinder, or the like, is connected to the gas introducing port 113. The gas introducing port 113 continues into an introduced gas hole 121, which passes through the wall of the casing main body section 115 toward the center area of the casing main body section 115 and communicates with a primary gas flow path 122 formed in the inside of the casing main body section 115. Also, the casing main body section 115 is provided with a partition wall 115a, which partitions off the primary gas flow path 122 and the pressure regulating chamber 111 from each other. The aperture 133, which is opened and closed by the main regulating valve 130, is formed at the center area, which is defined by the partition wall 115a. The shaft section 162 of the plunger 160 is inserted for sliding movement into the aperture 133. An area of a side surface of the partition wall 115a, which area stands facing the primary gas flow path 122 and is located in the vicinity of the aperture 133, acts as a valve seat 132 of the main regulating valve 130.

In accordance with the movement of the plunger 160, the valve body 131 of the main regulating valve 130 comes into close contact with the valve seat 132 and closes the aperture 133. In cases where the valve body 131 of the main regulating valve 130 moves away from the valve seat 132 and opens the aperture 133 in accordance with the movement of the plunger 160, a quantity of the gas in accordance with the quantity of the opening of the aperture 133 passes through the space between the inside peripheral surface of the partition wall 115a defining the aperture 133 and the outside peripheral surface of the plunger 160 and flows from the primary gas flow path 122 into the pressure regulating chamber 111.

The duplex-valve adjustor 170 having a tubular shape is fitted from an end of the casing main body section 115, which end is located on the side of the gas discharging port 114, into the primary gas flow path 122. The duplex-valve adjustor 170 has a hole on a tail end side, which hole acts as the gas discharging port 114 for discharging the gas having the regulated pressure. The gas discharging port 114 is connected to a second connector 119 for receiving the gas having the regulated pressure. The duplex-valve adjustor 170 has outside peripheral threads, which are engaged with end threads of the casing main body section 115, and the position of the duplex-valve adjustor 170 is thus adjusted. The duplex-valve adjustor 170 is secured at the adjusted position by a lock nut 117.

The duplex-valve adjustor 170 also has a leading end tube section 171, which is inserted for sliding movement into the primary gas flow path 122. A sealing material 172 is fitted onto the outer periphery of the leading end tube section 171. The sealing material 172 is brought into close contact with a region of an inside peripheral surface of the primary gas flow path 122, which region is located on the side more outward than the introduced gas hole 121. In this manner, the sealing material 172 performs sliding movement sealing at the outside periphery of the leading end tube section 171. Further, a part of the shaft section 162 of the plunger 160, which part is located between the valve body 131 of the main regulating valve 130 and the valve body 141 of the subsidiary regulating valve 140, is inserted for sliding movement into the aperture 143 of the leading end tube section 171. An area of a side surface of the leading end tube section 171, which area stands facing the gas discharging port 114 and is located in the vicinity of the aperture 143, acts as a valve seat 142 of the subsidiary regulating valve 140.

In accordance with the movement of the plunger 160, the valve body 141 of the subsidiary regulating valve 140 comes into close contact with the valve seat 142 and closes the aperture 143 of the leading end tube section 171. In cases where the valve body 141 of the subsidiary regulating valve 140 moves away from the valve seat 142 and opens the aperture 143 in accordance with the movement of the plunger 160, a quantity of the gas in accordance with the quantity of the opening of the aperture 143 passes through the space between the inside peripheral surface of the aperture 143 and the outside peripheral surface of the plunger 160 and flows from the primary gas flow path 122 into the gas discharging port 114, which is located on the regulated pressure side.

The position in the casing main body section 115, to which the duplex-valve adjustor 170 acting as the adjustment means is inserted, is adjusted such that, at the time at which the valve body 131 of the main regulating valve 130 comes into close contact with the valve seat 132 of the main regulating valve 130 and closes the aperture 133, the valve body 141 of the subsidiary regulating valve 140 also comes into close contact with the valve seat 142 of the subsidiary regulating valve 140 and closes the aperture 143, and such that the value of the pressure loss occurring at the main regulating valve 130 and the value of the pressure loss occurring at the subsidiary regulating valve 140 are equal to each other.

In accordance with the movement of the diaphragm 120, the main regulating valve 130 and the subsidiary regulating valve 140 co-operate with each other in order to reduce and regulate the unregulated pressure into the predetermined regulated pressure regardless of the fluctuation in unregulated pressure. How the main regulating valve 130 and the subsidiary regulating valve 140 operate will be described hereinbelow.

Firstly, the gas having flowed from the gas introducing port 113 into the primary gas flow path 122 passes through the main regulating valve 130, and the unregulated pressure of the gas is reduced into the regulated pressure. The gas having the regulated pressure passes through the secondary gas flow path 164 within the plunger 160 into the gas discharging port 114. The force, which is of a level equal to the product of the value of the pressure loss occurring at this time at the main regulating valve 130 and the projected valve body area of the main regulating valve 130, arises in the direction, which closes the main regulating valve 130 and retreats the plunger 160 (i.e., in the leftward direction in FIG. 1).

Also, the gas having the unregulated pressure within the primary gas flow path 122 passes through the aperture 143, i.e. through the space between the inside peripheral surface of the leading end tube section 171 of the duplex-valve adjustor 170 and the outside peripheral surface of the plunger 160, to the subsidiary regulating valve 140. The gas then passes through the subsidiary regulating valve 140, and the unregulated pressure of the gas is reduced to the regulated pressure. The gas having the regulated pressure flows to the gas discharging port 114. The gas discharging port 114 communicates with the pressure regulating chamber 111 through the secondary gas flow path 164. At this time, the force, which is of a level equal to the product of the value of the pressure loss occurring at the subsidiary regulating valve 140 and the projected valve body area of the subsidiary regulating valve 140, arises in the direction, which opens the subsidiary regulating valve 140 and advances the plunger 160 (i.e., in the rightward direction in FIG. 1). Specifically, the force acting upon the main regulating valve 130 and the force acting upon the subsidiary regulating valve 140 arise in the reverse directions.

Ordinarily, the value of the pressure loss, which occurs in the flow path of the main regulating valve 130, and the value of the pressure loss, which occurs in the flow path of the subsidiary regulating valve 140, will be different from each other. However, in this embodiment, since the duplex-valve adjustor 170 is located such that the duplex-valve adjustor 170 is capable of being moved for position adjustment in the axial direction, the value of the pressure loss, which occurs at the subsidiary regulating valve 140, is capable of being altered. Therefore, the value of the pressure loss, which occurs at the main regulating valve 130, is capable of being accurately canceled by the value of the pressure loss, which occurs in at the subsidiary regulating valve 140.

Further, the diaphragm 120 is supported by the plunger 160 and the supporter 180. The diaphragm 120 is kept at the position, at which the force due to the pressure difference between the regulated pressure and the atmospheric pressure and the urging force of the pressure regulating spring 151 are balanced with each other. In cases where the regulated pressure varies in accordance with a variation in quantity of the gas discharged from the gas discharging port 114, the variation in unregulated pressure, and the like, the quantity of the displacement of the diaphragm 120 varies in accordance with the variation in regulated pressure, and the position of the plunger 160 varies. Also, the main regulating valve 130 and the subsidiary regulating valve 140 move in accordance with the variation in position of the plunger 160 and keep the regulated pressure at the predetermined pressure. The urging force of the pressure regulating spring 151 is capable of being varied by the adjustment of the position of the pressure regulating screw 152 of the pressure setting section 150, and the regulated pressure is thus capable of being set at an arbitrary pressure.

Furthermore, each of the valve body 131 of the main regulating valve 130 and the valve body 141 of the subsidiary regulating valve 140 is constituted of the elastic body, which is formed as the O-ring. Therefore, in cases where the gas having the high dissolving characteristics, such as the dimethyl ether gas, is introduced into the pressure regulator 100, and each of the O-rings is brought into contact with the gas having the high dissolving characteristics and undergoes swelling and expansion in volume, the variation in volume of each of the O-rings is restricted so as to occur only in the direction, which is normal to the directions of valve opening and closing movements. Accordingly, the variation in pressure loss and the variation in gas flow rate due to the expansion in volume of each of the O-rings are capable of being suppressed.

Also, the pressure reduction from the unregulated pressure to the regulated pressure is performed by the combination of the two regulating valves, i.e. the combination of the main regulating valve 130 and the subsidiary regulating valve 140. Therefore, the value of the pressure loss occurring at each of the two regulating valves is capable of being kept to be one half of the value of the pressure loss, which occurs in cases where the pressure reduction is performed with only one regulating valve. Accordingly, the space between the valve body and the valve seat of each of the two regulating valves is capable of being set to be comparatively large. As a result, reliable performance is capable of being obtained in cases where the unregulated pressure is markedly high. Specifically, the reliable performance is capable of being obtained in cases where the degree of the required pressure reduction is high, the valve space between the valve body and the valve seat is set to be markedly small, and therefore a slight variation in valve space affects the regulated pressure.

In the first embodiment described above, each of the valve body 131 of the main regulating valve 130 and the valve body 141 of the subsidiary regulating valve 140 is constituted of the elastic body, which is formed as the O-ring. Alternatively, each of the valve seat 132 of the main regulating valve 130 and the valve seat 142 of the subsidiary regulating valve 140 may be constituted of the elastic body, which is formed as the O-ring. In such cases, each of the elastic body acting as the valve seat 132 and the elastic body acting as the valve seat 142 is located in a state in which the elastic body is controlled by a peripheral groove structure, or the like, such that the elastic body is prevented from deforming with respect to the directions of valve opening and closing movements. As another alternative, an elastic body other than the O-ring may be employed.

Figure 2:
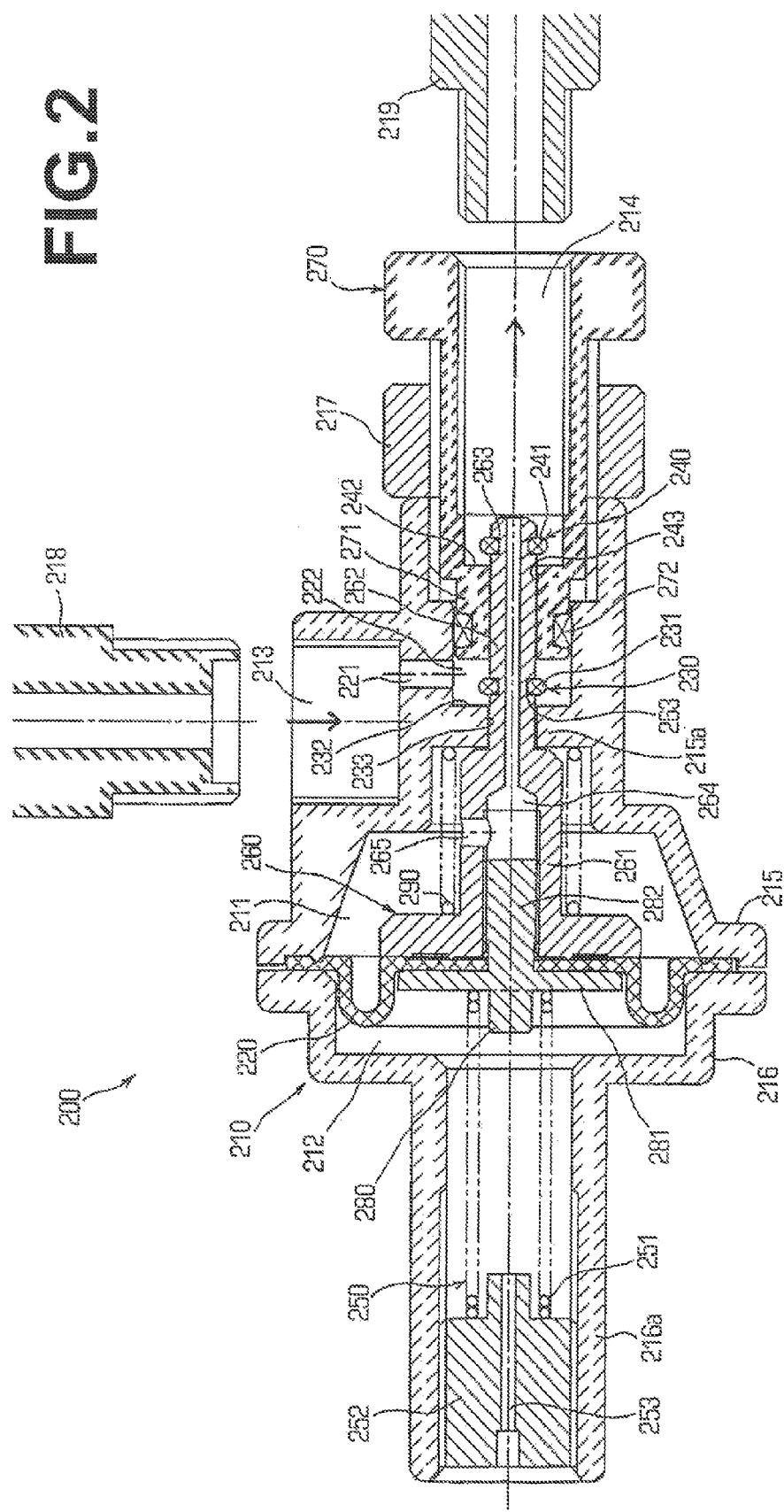
FIG. 2 is a sectional view showing a modification of the first embodiment of the pressure regulator in accordance with the present invention.

FIG. 2 is a sectional view showing a modification of the first embodiment of the pressure regulator in accordance with the present invention. A pressure regulator 200, which is the modification of the first embodiment of the pressure regulator in accordance with the present invention, has a structure basically identical with the structure of the pressure regulator 100 shown in FIG. 1, except that the pressure regulator 200 further comprises a valve closing spring 290, which is located within a pressure regulating chamber 211. In FIG. 2, similar elements are numbered with the similar reference numerals with respect to FIG. 1.

The valve closing spring 290 urges a plunger 260 toward the direction that retreats the plunger 260 (the leftward direction in FIG. 2), i.e. toward the direction of closing of a main regulating valve 230. Specifically, the valve closing spring 290 is constituted of a coiled spring. The valve closing spring 290 is located in the vicinity of the outside periphery of a trunk section 261 and in a contracted state such that one end of the valve closing spring 290 is in abutment with a side surface of a partition wall 215a of a casing main body section 215, and such that the other end of the valve closing spring 290 is in abutment with a side surface of the plunger 260 so as to push a diaphragm 220 toward the side of the atmospheric chamber 212.

Also, the pressure adjustment with a pressure regulating screw 252 of a pressure setting section 250 is set such that the urging force of a pressure regulating spring 251 is larger by the urging force of the valve closing spring 290 than the urging force of the pressure regulating spring 151 in the embodiment of FIG. 1.

With the modification of the first embodiment of the pressure regulator in accordance with the present invention, which modification is provided with the valve closing spring 290 described above, in cases where the urging force of the pressure regulating spring 251 is set to be small, and the set pressure of the regulated pressure is low, the diaphragm 220 is capable of being displaced in accordance with the pressure difference between the pressure regulating chamber 211 and an atmospheric chamber 212, and accurate operations of the main regulating valve 230 and a subsidiary regulating valve 240 are capable of being obtained in accordance with the movement of the plunger 260. Therefore, reliable pressure regulation is capable of being performed. Also, in cases where the urging force of the pressure regulating spring 251 is set to be smaller than the urging force of the valve closing spring 290, the plunger 260 is capable of being retreated by the urging force of the valve closing spring 290, and a blocking state, in which the main regulating valve 230 and the subsidiary regulating valve 240 are closed, is capable of being obtained. In this manner, the gas discharging from a gas discharging port 214 is capable of being ceased.

The first embodiment of FIG. 1 described above, which is not provided with the valve closing spring 290 described above, is based upon the presumption that the regulated pressure is ordinarily set at a comparatively high pressure. With the first embodiment of FIG. 1 described above, in cases where the set pressure of the regulated pressure is sufficiently higher than the atmospheric pressure, a comparatively large force in accordance with the pressure difference between the regulated pressure and the atmospheric pressure acts upon the diaphragm 120, and the accurate operations for pressure regulation are capable of being obtained with the main regulating valve 130 and the subsidiary regulating valve 140 moving together with the plunger 160. However, with the first embodiment of FIG. 1 described above, in cases where the regulated pressure is set at a low pressure close to the atmospheric pressure, the force for displacing the diaphragm 120 in accordance with the pressure difference between the regulated pressure and the atmospheric pressure becomes small. Also, a force capable of displacing the diaphragm 120 in the direction of retreat of the plunger 160 does not occur besides the force due to the pressure difference between the regulated pressure and the atmospheric pressure. Therefore, the response characteristics become comparatively bad, and the pressure regulating effects become unstable. However, with the aforesaid modification of the first embodiment of the pressure regulator in accordance with the present invention, the force for displacing the diaphragm 220 in the direction of retreat of the plunger 260 is obtained with the provision of the valve closing spring 290. Therefore, with the aforesaid modification, in cases where the regulated pressure is set to be low, the response characteristics of the diaphragm 220 are capable of being enhanced, and the reliable pressure regulating effects are capable of being obtained.

Figure 3:
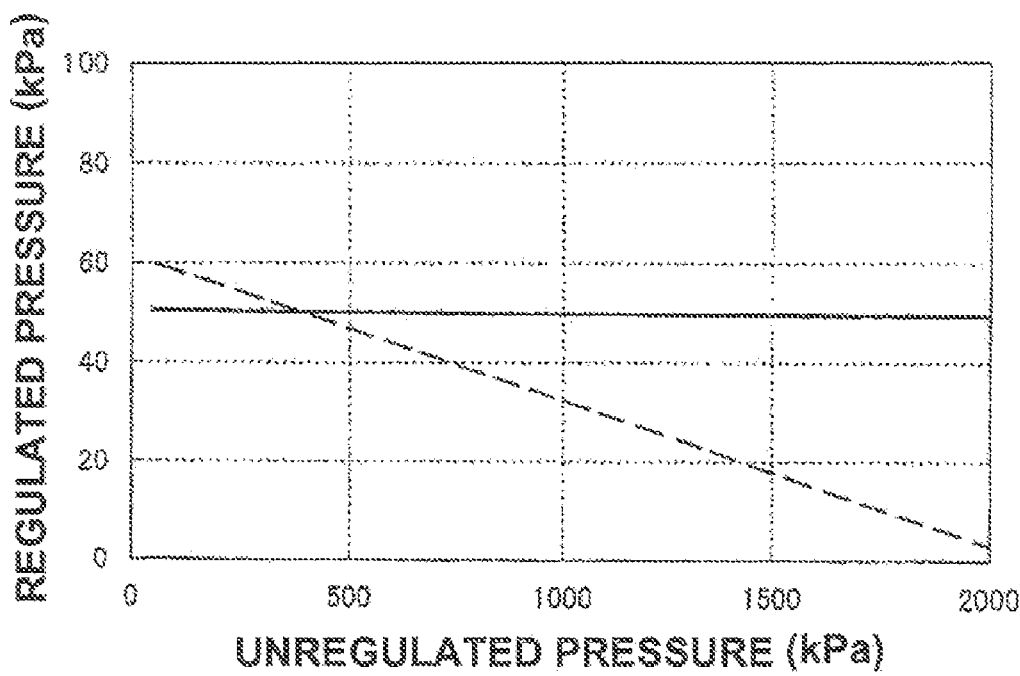
FIG. 3 is a graph showing the results of measurement of a variation in regulated pressure, which results were obtained with the pressure regulator shown in FIG. 1 in cases where an unregulated pressure of a high-pressure gas supplied to the pressure regulator shown in FIG. 1 was altered, and the results of measurement of a variation in regulated pressure, which results were obtained with a pressure regulator of a comparative example in cases where the unregulated pressure of the high-pressure gas supplied to the pressure regulator of the comparative example was altered.
Figure 4:
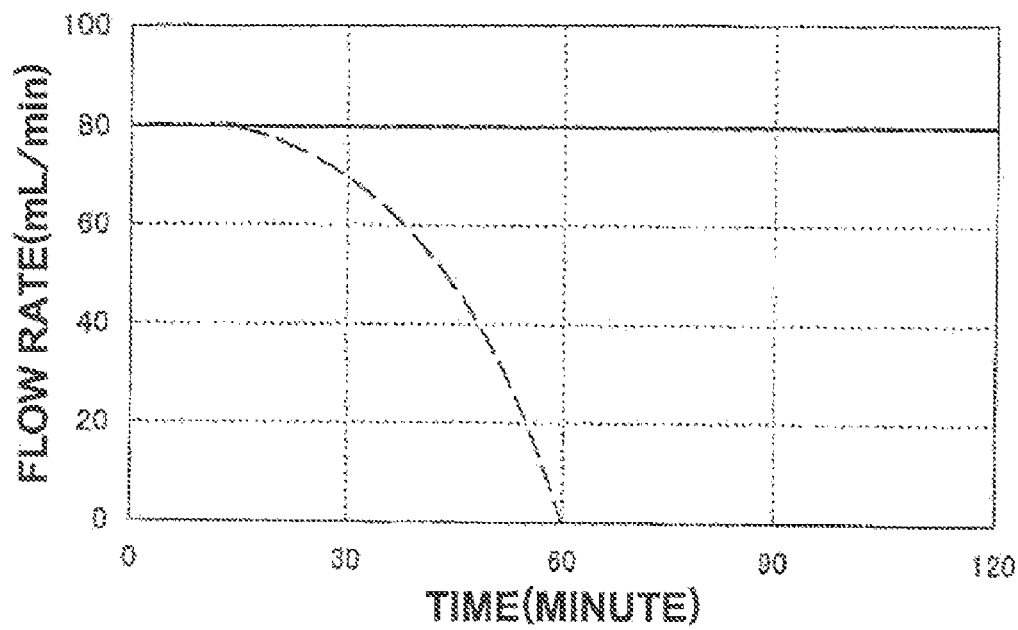
FIG. 4 is a graph showing the results of measurement of a variation in gas flow rate with respect to the passage of time, which results were obtained with the pressure regulator shown in FIG. 1 in cases where a dimethyl ether gas was utilized as the high-pressure gas supplied to the pressure regulator shown in FIG. 1, and the results of measurement of a variation in gas flow rate with respect to the passage of time, which results were obtained with the pressure regulator of the comparative example in cases where the dimethyl ether gas was utilized as the high-pressure gas supplied to the pressure regulator of the comparative example.
Figure 14:
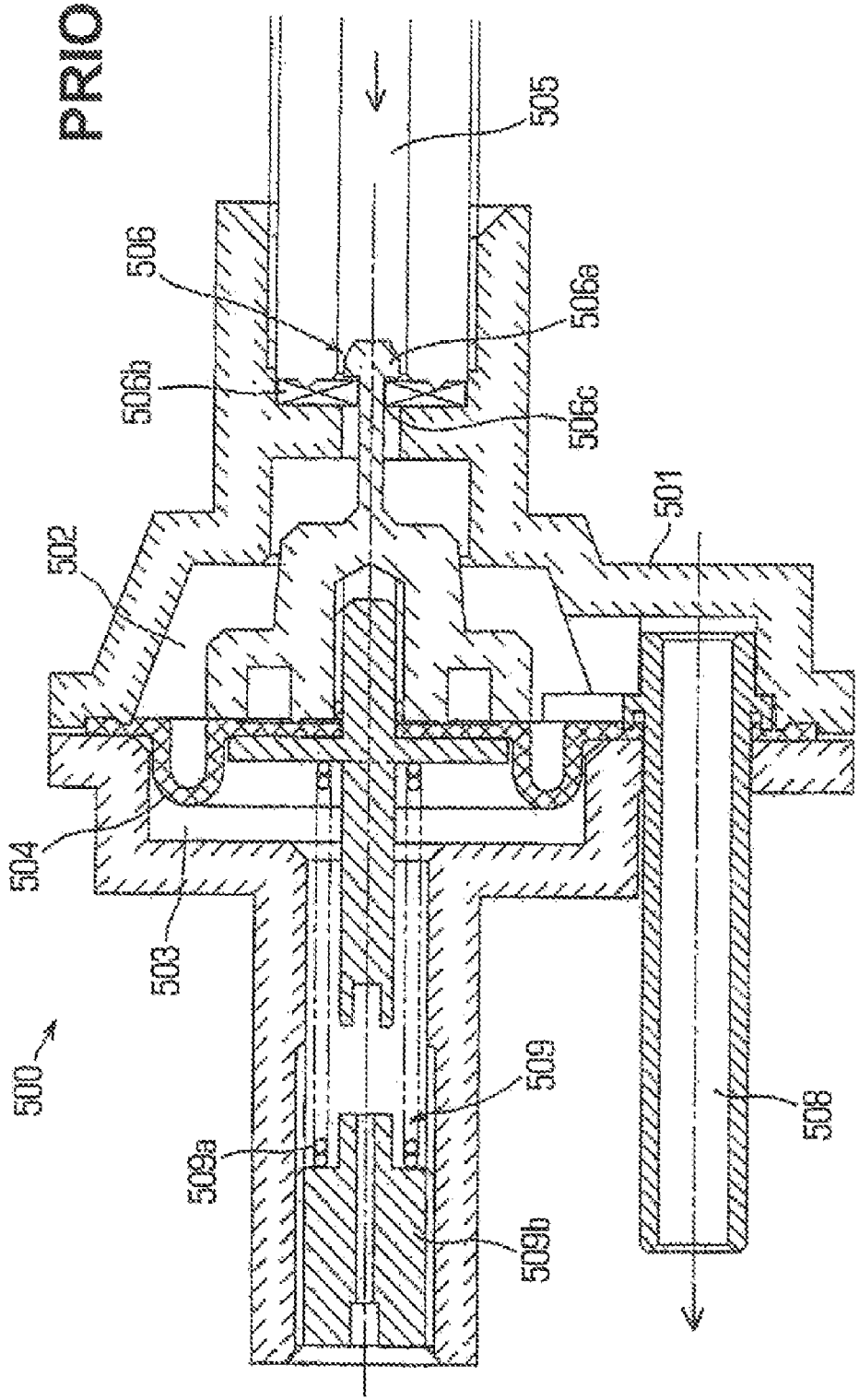
FIG. 14 is a sectional view showing the pressure regulator of the comparative example.

The results of experiments conducted for evaluating the pressure regulating effects of the first embodiment of the pressure regulator in accordance with the present invention (i.e., the pressure regulator 100 having the structure illustrated in FIG. 1) and the results of experiments conducted for evaluating the pressure regulating effects of a pressure regulator of a comparative example (i.e., a single-valve type pressure regulator 500 illustrated in FIG. 14) will be described hereinbelow with reference to FIG. 3 and FIG. 4. FIG. 3 is a graph showing the results of measurement of a variation in regulated pressure, which results were obtained with the pressure regulator 100 shown in FIG. 1 in cases where an unregulated pressure of a high-pressure gas supplied to the pressure regulator 100 shown in FIG. 1 was altered, and the results of measurement of a variation in regulated pressure, which results were obtained with the single-valve type pressure regulator 500 of the comparative example in cases where the unregulated pressure of the high-pressure gas supplied to the single-valve type pressure regulator 500 of the comparative example was altered. FIG. 4 is a graph showing the results of measurement of a variation in gas flow rate with respect to the passage of time, which results were obtained with the pressure regulator 100 shown in FIG. 1 in cases where a dimethyl ether gas was utilized as the high-pressure gas supplied to the pressure regulator 100 shown in FIG. 1, and the results of measurement of a variation in gas flow rate with respect to the passage of time, which results were obtained with the single-valve type pressure regulator 500 of the comparative example in cases where the dimethyl ether gas was utilized as the high-pressure gas supplied to the single-valve type pressure regulator 500 of the comparative example.

Figure 15A:
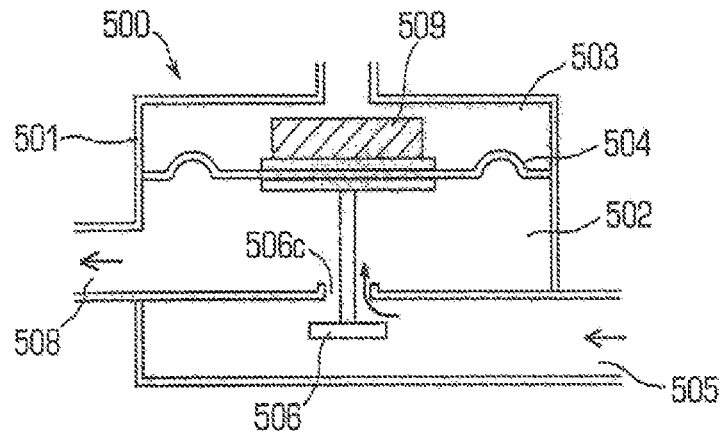
FIG. 15A is a schematic view showing a fundamental structure of an ordinary single-valve type pressure regulator.
Figure 15B:
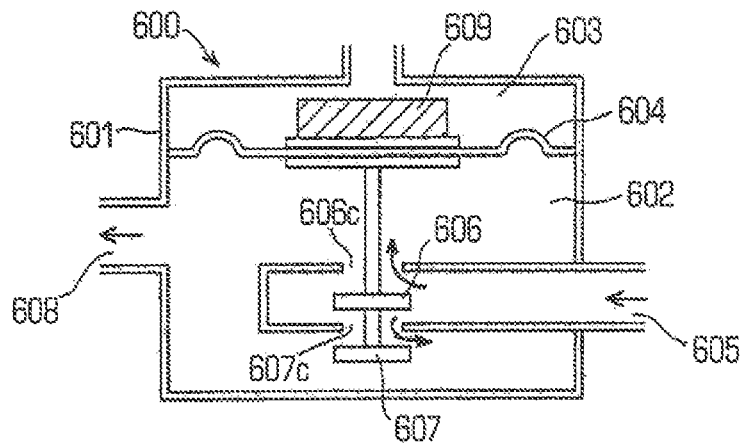
FIG. 15B is a schematic view showing a fundamental structure of an ordinary duplex-valve type pressure regulator.
Figure 15C:
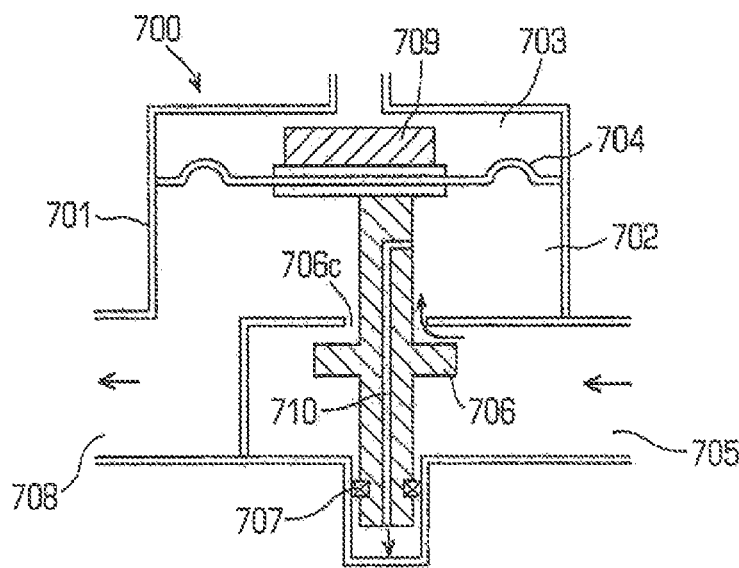
FIG. 15C is a schematic view showing a fundamental structure of an ordinary modified duplex-valve type pressure regulator.

The single-valve type pressure regulator 500 illustrated in FIG. 14 has a fundamental structure basically identical with the structure shown in FIG. 15A. In FIG. 14, similar elements are numbered with the same reference numerals with respect to FIG. 15A. With the single-valve type pressure regulator 500 illustrated in FIG. 14, the high-pressure gas having the unregulated pressure is introduced through the gas introducing port 505 and passes through the regulating valve 506, which performs the valve opening and closing operations in accordance with the displacement of the diaphragm 504. (A valve body 506a of the regulating valve 506 is constituted of a rigid body, and a valve seat 506b of the regulating valve 506 is constituted of an elastic body.) The gas then flows into the pressure regulating chamber 502, which is partitioned off by the diaphragm 504 from the atmospheric chamber 503. The gas having the regulated pressure within the pressure regulating chamber 502 is discharged through the gas discharging port 508. The urging force acting upon the diaphragm 504 is adjusted by a pressure setting section 509, which is provided with a pressure regulating spring 509a and a pressure regulating screw 509b. The regulated pressure is thus set.

MEASUREMENT EXAMPLE 1

In Measurement Example 1, measurement was made to find a variation in regulated pressure in cases where an unregulated pressure of a high-pressure gas (an inert gas) supplied to each of the pressure regulators was altered. The results of the measurement obtained with the pressure regulator 100 of FIG. 1 in the example in accordance with the present invention are indicated by the solid line in FIG. 3. Also, the results of the measurement obtained with the single-valve type pressure regulator 500 of FIG. 14 in the comparative example are indicated by the broken line in FIG. 3.

In both the example in accordance with the present invention and the comparative example, the regulated pressure was set by the adjustment of the pressure regulating screw 152 of the pressure setting section 150 or the pressure regulating screw 509b of the pressure setting section 509, such that, when the unregulated pressure was equal to 400 kPa, the regulated pressure became equal to 50 kPa. At this time, the gas flow rate was equal to 40 mL/min.

As indicated by the solid line in the graph of FIG. 3, with the pressure regulator 100 of FIG. 1 in accordance with the present invention, in cases where the unregulated pressure was altered over the range of 50 kPa to 2000 kPa, the regulated pressure did not vary and was set at the set value (50 kPa), and the predetermined regulated pressure was kept. It was capable of being confirmed that, with the functions of the main regulating valve 130 and the subsidiary regulating valve 140 of the pressure regulator 100 of FIG. 1 in accordance with the present invention, the adverse effect of the force, which accompanies the pressure loss, was capable of being canceled, and the pressure regulating effects were capable of being obtained with respect to the wide unregulated pressure range.

However, as indicated by the broken line in the graph of FIG. 3, with the single-valve type pressure regulator 500 of FIG. 14 in the comparative example, in cases where the unregulated pressure fell within the region lower than 400 kPa, the regulated pressure was higher than the set value (50 kPa). Also, in cases where the unregulated pressure fell within the region higher than 400 kPa, the regulated pressure varied such that the regulated pressure became lower than the set value (50 kPa), and such that, as the unregulated pressure became high, the regulated pressure became low as a whole. In this manner, with the single-valve type pressure regulator 500 of FIG. 14 in the comparative example, the regulated pressure was not capable of being kept at the predetermined pressure.

MEASUREMENT EXAMPLE 2

In Measurement Example 2, measurement was made to find a variation in gas flow rate with respect to the passage of time in cases where a dimethyl ether gas, which was a typical gas causing an elastic material (a rubber material) to swell, was utilized as the high-pressure gas supplied to each of the pressure regulators. The results of the measurement obtained with the pressure regulator 100 of FIG. 1 in the example in accordance with the present invention are indicated by the solid line in FIG. 4. Also, the results of the measurement obtained with the single-valve type pressure regulator 500 of FIG. 14 in the comparative example are indicated by the broken line in FIG. 4. The initial flow rate of the dimethyl ether gas was equal to 80 mL/min. The test was conducted at a temperature, at which the vapor pressure was equal to 400 kPa.

As indicated by the solid line in the graph of FIG. 4, with the pressure regulator 100 of FIG. 1 in accordance with the present invention, in cases where a period of time of as long as 120 minutes had elapsed, the flow rate of the discharged gas did not vary and was kept at the initial flow rate. It was capable of being confirmed that, with the pressure regulator 100 of FIG. 1 in accordance with the present invention, even though the O-rings were subjected to the swelling due to the contact with the gas, adverse effects upon the gas flow rate did not occur.

However, as indicated by the broken line in the graph of FIG. 4, with the single-valve type pressure regulator 500 of FIG. 14 in the comparative example, due to a variation in valve space accompanying the swelling of the valve seat 506b constituted of the elastic body, the gas flow rate begun becoming low at the time at which a period of time of approximately 15 minutes had elapsed after the start of the measurement. Thereafter, the gas flow rate became markedly low with the passage of time. At the time at which a period of time of approximately 60 minutes had elapsed after the start of the measurement, the gas flow rate became 0 (zero), and the gas could not be discharged any more.

Figure 5:
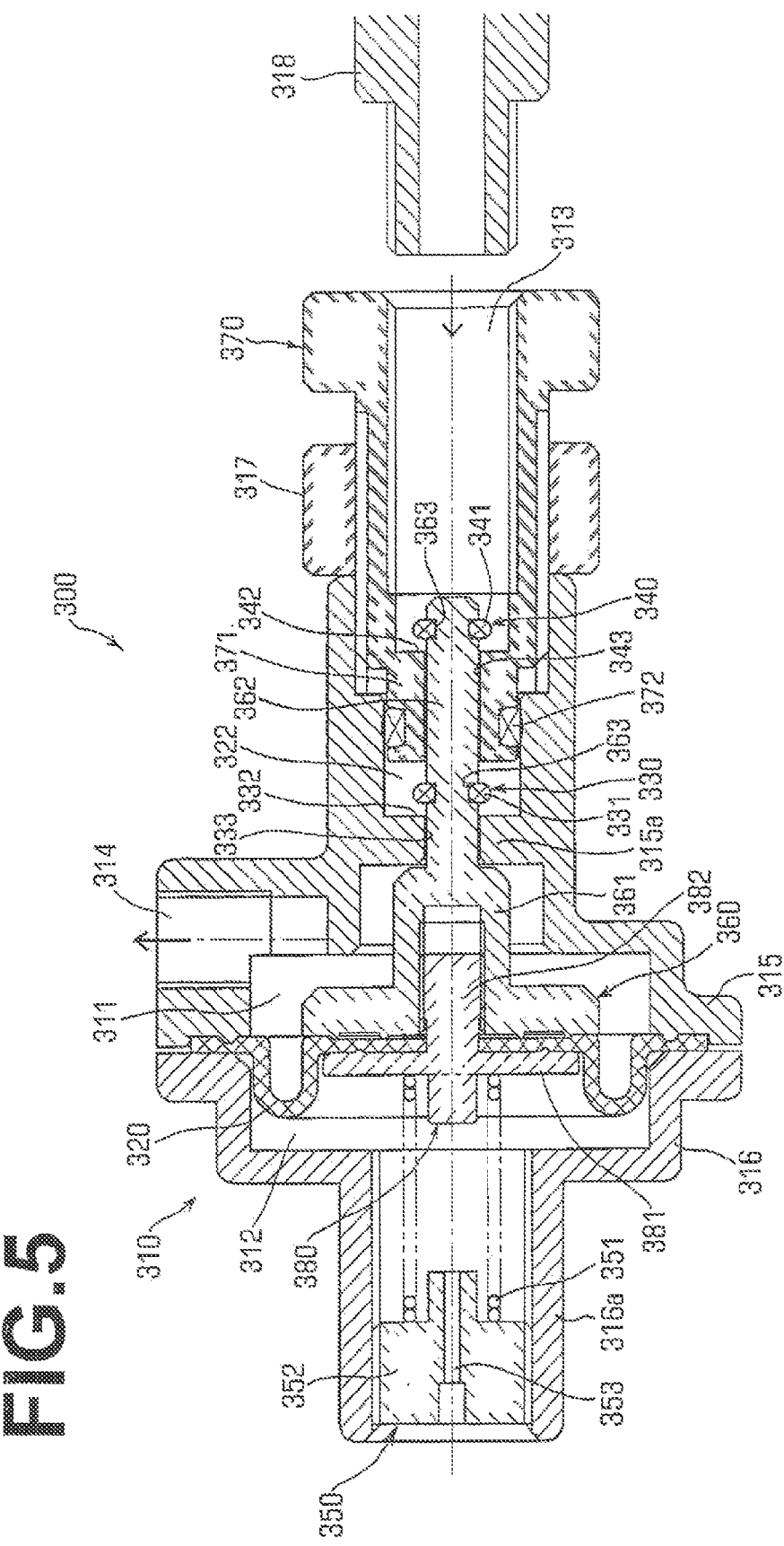
FIG. 5 is a sectional view showing a second embodiment of the pressure regulator in accordance with the present invention.

A second embodiment of the pressure regulator in accordance with the present invention will be described hereinbelow. FIG. 5 is a sectional view showing a second embodiment of the pressure regulator in accordance with the present invention.

With reference to FIG. 5, a pressure regulator 300, which is the second embodiment of the pressure regulator in accordance with the present invention, is used for the stabilization of fuel supply to solid oxide type fuel cells (SOFC's) and solid polymer type fuel cells (PEFC's). Also, a dimethyl ether gas is utilized as the high-pressure gas to be supplied to the pressure regulator 300. The pressure regulator 300 comprises a diaphragm 320, which partitions off a region within a casing 310 into a pressure regulating chamber 311 and an atmospheric chamber 312. The pressure regulator 300 also comprises a gas introducing port 313, through which the high-pressure gas having an unregulated pressure is introduced into the pressure regulator 300. The pressure regulator 300 further comprises a main regulating valve 330, which operates by being interlocked with the diaphragm 320. The main regulating valve 330 performs operations for opening and closing an aperture 333, through which a preliminary chamber 322 and the pressure regulating chamber 311 communicate with each other. The operations of the main regulating valve 330 for opening and closing the aperture 333 are performed from the side opposite to the pressure regulating chamber 311. The main regulating valve 330 thus reduces the gas pressure within the preliminary chamber 322 to a regulated pressure. The pressure regulator 300 still further comprises a preliminary regulating valve 340, which operates by being interlocked with the diaphragm 320. The preliminary regulating valve 340 performs operations for opening and closing an aperture 343, through which the gas introducing port 313 and the preliminary chamber 322 communicate with each other. The operations of the preliminary regulating valve 340 for opening and closing the aperture 343 are performed from the unregulated pressure side. The pressure regulator 300 also comprises a gas discharging port 314, through which the gas having been pressure-regulated through the pressure regulating chamber 311 and having the regulated pressure is discharged from the pressure regulator 300. The pressure regulator 300 further comprises a pressure setting section 350 for adjusting a quantity of displacement of the diaphragm 320, which receives the regulated pressure within the pressure regulating chamber 311 and is thereby displaced. The diaphragm 320, the main regulating valve 330, and the preliminary regulating valve 340 are linked and interlocked with one another by a plunger 360. The pressure regulator 300 still further comprises an adjustor 370, which acts as the adjustment means for adjusting the position of a valve seat of the preliminary regulating valve 340 and thereby adjusting a value of a pressure loss, which occurs at the preliminary regulating valve 340.

The main regulating valve 330 and the preliminary regulating valve 340 co-operate to perform the pressure reduction of the unregulated pressure of the high-pressure gas to the regulated pressure, a pressure loss occurring at each of the main regulating valve 330 and the preliminary regulating valve 340. With the adjustor (adjustment means) 370, the ratio of the value of the pressure loss, which occurs at the preliminary regulating valve 340, to the value of the pressure loss, which occurs at the main regulating valve 330, is capable of being adjusted.

Also, each of a valve body 331 of the main regulating valve 330 and a valve body 341 of the preliminary regulating valve 340 is constituted of an elastic body, which is formed as an O-ring. Each of the elastic body of the main regulating valve 330 and the elastic body of the preliminary regulating valve 340 is located in a state in which the elastic body is controlled by a peripheral groove section 363 such that the elastic body is prevented from deforming with respect to directions of valve opening and closing movements. Therefore, a dimethyl ether gas, or the like, which will have adverse effects, such as swelling effects, upon the elastic body, is capable of being used as the high-pressure gas.

The structure of the casing 310, the structure of the diaphragm 320, and the structure of the supporter 380 are basically identical with the structure of the casing 110, the structure of the diaphragm 120, and the structure of the supporter 180, respectively, in the first embodiment described above.

The plunger 360 comprises a trunk section 361, which is secured to the diaphragm 320 and located within the pressure regulating chamber 311, and a shaft section 362, which extends in the axial direction of the plunger 360 from an end of the trunk section 361. The shaft section 362 is provided with two peripheral groove sections 363, 363, which are located at a predetermined spacing from each other. The valve body 331 of the main regulating valve 330, which valve body is constituted of the O-ring (i.e., the elastic body), is fitted into one of the peripheral groove sections 363, 363. Also, the valve body 341 of the preliminary regulating valve 340, which valve body is constituted of the O-ring (i.e., the elastic body), is fitted into the other peripheral groove section 363.

The casing main body section 315 is provided with a partition wall 315a, which partitions off the preliminary chamber 322 and the pressure regulating chamber 311 from each other. The aperture 333, which is opened and closed by the main regulating valve 330, is formed at the center area, which is defined by the partition wall 315a. The shaft section 362 of the plunger 360 is inserted for sliding movement into the aperture 333. An area of a side surface of the partition wall 315a, which area stands facing the preliminary chamber 322 and is located in the vicinity of the aperture 333, acts as a valve seat 332 of the main regulating valve 330.

In accordance with the movement of the plunger 360, the valve body 331 of the main regulating valve 330 comes into close contact with the valve seat 332 and closes the aperture 333. In cases where the valve body 331 of the main regulating valve 330 moves away from the valve seat 332 and opens the aperture 333 in accordance with the movement of the plunger 360, a quantity of the gas in accordance with the quantity of the opening of the aperture 333 passes through the space between the inside peripheral surface of the partition wall 315a defining the aperture 333 and the outside peripheral surface of the plunger 360 and flows from the preliminary chamber 322 into the pressure regulating chamber 311.

The adjustor 370 having a tubular shape is fitted from an end of the casing main body section 315, which end is located on the side of the gas introducing port 313, into the preliminary chamber 322. The adjustor 370 has outside peripheral threads, which are engaged with end threads of the casing main body section 315, and the position of the adjustor 370 is thus adjusted. The adjustor 370 is secured at the adjusted position by a lock nut 317. The adjustor 370 has a hole on a tail end side, which hole acts as the gas introducing port 313 for introducing the high-pressure gas into the pressure regulator 300. A first connector 318 for introducing the high-pressure gas, such as the dimethyl ether gas, which has the unregulated pressure and is supplied from a gas cylinder, or the like, is connected to the gas introducing port 313.

A side section of the pressure regulating chamber 311 is provided with the gas discharging port 314, which communicates with the pressure regulating chamber 311 and is open to the exterior. The gas having the regulated pressure obtained through the pressure regulation is discharged through the gas discharging port 314. The gas discharging port 314 is connected to a second connector (not shown) for receiving the gas having the regulated pressure.

The adjustor 370 also has a leading end tube section 371, which is inserted for sliding movement into the preliminary chamber 322. A sealing material 372 is fitted onto the outer periphery of the leading end tube section 371. The sealing material 372 is brought into close contact with an inside peripheral surface of the preliminary chamber 322. In this manner, the sealing material 372 performs sliding movement sealing at the outside periphery of the leading end tube section 371.

Further, a part of the shaft section 362 of the plunger 360, which part is located between the valve body 331 of the main regulating valve 330 and the valve body 341 of the preliminary regulating valve 340, is inserted for sliding movement into the aperture 343 of the leading end tube section 371. An area of a side surface of the leading end tube section 371, which area stands facing the gas introducing port 313 and is located in the vicinity of the aperture 343, acts as a valve seat 342 of the preliminary regulating valve 340.

In accordance with the movement of the plunger 360, the valve body 341 of the preliminary regulating valve 340 comes into close contact with the valve seat 342 and closes the aperture 343 of the leading end tube section 371. In cases where the valve body 341 of the preliminary regulating valve 340 moves away from the valve seat 342 and opens the aperture 343 in accordance with the movement of the plunger 360, a quantity of the gas in accordance with the quantity of the opening of the aperture 343 passes through the space between the inside peripheral surface of the aperture 343 and the outside peripheral surface of the plunger 360 and flows from the gas introducing port 313 into the preliminary chamber 322.

The position in the casing main body section 315, to which the adjustor 370 acting as the adjustment means is inserted, is adjusted such that, at the time at which the valve body 331 of the main regulating valve 330 comes into close contact with the valve seat 332 of the main regulating valve 330 and closes the aperture 333, the valve body 341 of the preliminary regulating valve 340 also comes into close contact with the valve seat 342 of the preliminary regulating valve 340 and closes the aperture 343. The adjustor 370 thus adjusts the value of the pressure loss, which occurs at the preliminary regulating valve 340.

Each of the plunger 360 and the supporter 380 may be constituted of a light metal or a light metal alloy, such as aluminum or duralumin. Alternatively, each of the plunger 360 and the supporter 380 may be constituted of a polyamide (PA), a polyacetal (POM), a polybutylene terephthalate (PBT), or a polypropylene (PP), which is a crystalline resin. As another alternative, each of the plunger 360 and the supporter 380 may be constituted of an acetal, a polycarbonate, or acrylonitrile-butadiene-styrene, which is a non-crystalline resin, the non-crystalline resin having a surface coated with an epoxy resin or a polyamide resin. In cases where each of the plunger 360 and the supporter 380 is constituted of one of the materials enumerated above, each of the plunger 360 and the supporter 380 is capable of being kept light in weight and imparted with the resistance to the dimethyl ether gas.

Also, the casing 310 may be constituted of a polyamide (PA), a polyacetal (POM), a polybutylene terephthalate (PBT), or a polypropylene (PP), which is a crystalline resin. Alternatively, the casing 310 may be constituted of an acetal, a polycarbonate, or acrylonitrile-butadiene-styrene, which is a non-crystalline resin, the non-crystalline resin having a surface coated with an epoxy resin or a polyamide resin. In cases where the casing 310 is constituted of one of the materials enumerated above, the casing 310 is capable of being kept light in weight and imparted with the resistance to the dimethyl ether gas.

The aforesaid epoxy resin, with which the surface of the non-crystalline resin described above may be coated, should preferably contain a polyphenol and epourea as principal constituents.

Also, the casing 310 (i.e., the casing main body section 315 and a cover section 316) may be constituted of a polyamide (PA), a polyacetal (POM), a polybutylene terephthalate (PBT), or a polypropylene (PP), which is a crystalline resin, and the casing 310 may be formed with the ultrasonic fusion bonding.

In cases where each of the plunger 360 and the supporter 380 is kept light in weight, the response characteristics of the main regulating valve 330 and the preliminary regulating valve 340 with respect to the displacement of the diaphragm 320 are capable of being enhanced, and the chattering phenomenon is capable of being prevented from occurring. Specifically, since the plunger 360, to which the main regulating valve 330 and the preliminary regulating valve 340 are fitted, and the supporter 380 are secured to the diaphragm 320, if the weight of each of the plunger 360 and the supporter 380 is heavy, the response characteristics of the main regulating valve 330 and the preliminary regulating valve 340 with respect to the displacement of the diaphragm 320 will become bad. Also, due to excessive inertia force, the quantity of the displacement of the diaphragm 320 will become larger than the quantity of the displacement in accordance with the pressure difference, and excessive displacement of the diaphragm 320 will then occur in the reverse direction. The excessive displacement of the diaphragm 320 will thus be iterated, and the vibration (the chattering phenomenon) will be caused to occur. Therefore, the weight of each of the constituent parts should be kept as light as possible. Actually, in cases where each of the plunger 360 and the supporter 380 is constituted of aluminum, duralumin, or the resin, the chattering phenomenon does not occur.

Also, in cases where the casing 310 is constituted of the resin, the casing 310 is capable of being kept light in weight and low in cost. In particular, in cases where the casing 310 is constituted of the resin, which is capable of being subjected to the ultrasonic bonding, the assembly operation is capable of being facilitated. Specifically, if the entire casing 310 is constituted of a metal or a diecast metal, the weight of the entire casing 310 will become heavy, and the cost of the casing 310 will become high. Also, since it is necessary for the operation for securing with screws to be performed, the assembly operation cannot be kept easy. In cases where the casing 310 is constituted of the resin as described above, the casing 310 is capable of being kept light in weight and low in cost. Also, since the casing 310 is capable of being formed with the ultrasonic bonding, the operation for assembling the casing 310 is capable of being performed easily.

If the members, such as the casing 310, the plunger 360, and the supporter 380, which come into direct contact with the gas, are constituted of a metal, in cases where the high-pressure gas is primarily the dimethyl ether gas, or the like, which has the high dissolving characteristics, a slight amount of a metal ion will be dissolved out into the gas and will adversely affect the appliances to which the gas having been subjected to the pressure regulation is supplied. From this point of view, each of the casing 310, the plunger 360, and the supporter 380 should preferably be constituted of the resin.

Specifically, it is expected that the dimethyl ether gas is capable of being used as the fuel for the solid oxide type fuel cells (SOFC's) and the solid polymer type fuel cells (PEFC's). In both the cases of the solid oxide type fuel cells (SOFC's) and the solid polymer type fuel cells (PEFC's), it is markedly undesirable that metal ions are present in the dimethyl ether gas supplied as the fuel. Therefore, the aforesaid structure constituted of the resin should preferably be employed.

In accordance with the movement of the diaphragm 320, the main regulating valve 330 and the preliminary regulating valve 340 co-operate with each other in order to reduce and regulate the unregulated pressure into the predetermined regulated pressure regardless of the fluctuation in unregulated pressure. How the main regulating valve 330 and the preliminary regulating valve 340 operate will be described hereinbelow.

Firstly, the gas having flowed from the gas introducing port 313 passes through the preliminary regulating valve 340, which is located at the stage prior to the main regulating valve 330, and the gas is subjected to the preliminary pressure reduction. The gas having been subjected to the preliminary pressure reduction passes through the aperture 343, i.e. through the space between the inside peripheral surface of the leading end tube section 371 of the adjustor 370 and the outside peripheral surface of the plunger 360, into the preliminary chamber 322. The gas within the preliminary chamber 322 then passes through the main regulating valve 330, and the pressure of the gas is accurately reduced to the regulated pressure. The gas having the regulated pressure passes through the aperture 333 and the pressure regulating chamber 311 and is then discharged through the gas discharging port 314.

The diaphragm 320 is supported by the plunger 360 and the supporter 380. The diaphragm 320 is kept at the position, at which the force due to the pressure difference between the regulated pressure and the atmospheric pressure and the urging force of the pressure regulating spring 351 are balanced with each other. In cases where the regulated pressure varies in accordance with a variation in quantity of the gas discharged from the gas discharging port 314, the variation in unregulated pressure, and the like, the quantity of the displacement of the diaphragm 320 varies in accordance with the variation in regulated pressure, and the position of the plunger 360 varies. Also, the main regulating valve 330 and the preliminary regulating valve 340 move in accordance with the variation in position of the plunger 360 and keep the regulated pressure at the predetermined pressure. The urging force of the pressure regulating spring 351 is capable of being varied by the adjustment of the position of the pressure regulating screw 352 of the pressure setting section 350, and the regulated pressure is thus capable of being set at an arbitrary pressure.

Also, the pressure reduction from the unregulated pressure to the regulated pressure is performed by the combination of the two regulating valves, i.e. the combination of the main regulating valve 330 and the preliminary regulating valve 340. Therefore, the value of the pressure loss occurring at each of the two regulating valves 330 and 340 is capable of being kept to be smaller than the value of the pressure loss, which occurs in cases where the pressure reduction is performed with only one regulating valve. Accordingly, each of the space between the valve body 331 and the valve seat 332 of the main regulating valve 330 and the space between the valve body 341 and the valve seat 342 of the preliminary regulating valve 340 is capable of being set to be comparatively large. As a result, reliable performance is capable of being obtained in cases where the unregulated pressure is markedly high. Specifically, the reliable performance is capable of being obtained in cases where the degree of the required pressure reduction is high, the valve space between the valve body and the valve seat is set to be markedly small, and therefore a slight variation in valve space affects the regulated pressure.

Further, the valve body 331 of the main regulating valve 330 and the valve body 341 of the preliminary regulating valve 340 are fitted onto the plunger 360. Both the main regulating valve 330 and the preliminary regulating valve 340 perform the valve opening and closing operations in accordance with the deformation of the one diaphragm 320 and the one pressure regulating spring 351. Therefore, the response characteristics of the main regulating valve 330 and the preliminary regulating valve 340 with respect to the variation in unregulated pressure are capable of being kept good. Also, with respect to marked fluctuation in unregulated pressure, the follow-up speed is capable of being kept high, and the response characteristics are capable of being kept good. Therefore, reliable pressure regulation is capable of being performed.

Furthermore, each of the valve body 331 of the main regulating valve 330 and the valve body 341 of the preliminary regulating valve 340 is constituted of the elastic body, which is formed as the O-ring. Therefore, in cases where the gas having the high dissolving characteristics, such as the dimethyl ether gas, is introduced into the pressure regulator 300, and each of the O-rings is brought into contact with the gas having the high dissolving characteristics and undergoes swelling and expansion in volume, the variation in volume of each of the O-rings is restricted so as to occur only in the direction, which is normal to the directions of valve opening and closing movements. Accordingly, the variation in pressure loss and the variation in gas flow rate due to the expansion in volume of each of the O-rings are capable of being suppressed.

In the second embodiment described above, each of the valve body 331 of the main regulating valve 330 and the valve body 341 of the preliminary regulating valve 340 is constituted of the elastic body, which is formed as the O-ring. Alternatively, each of the valve seat 332 of the main regulating valve 330 and the valve seat 342 of the preliminary regulating valve 340 may be constituted of the elastic body, which is formed as the O-ring. In such cases, each of the elastic body acting as the valve seat 332 and the elastic body acting as the valve seat 342 is located in a state in which the elastic body is controlled by a peripheral groove structure, or the like, such that the elastic body is prevented from deforming with respect to the directions of valve opening and closing movements. As another alternative, an elastic body other than the O-ring may be employed.

Figure 6:
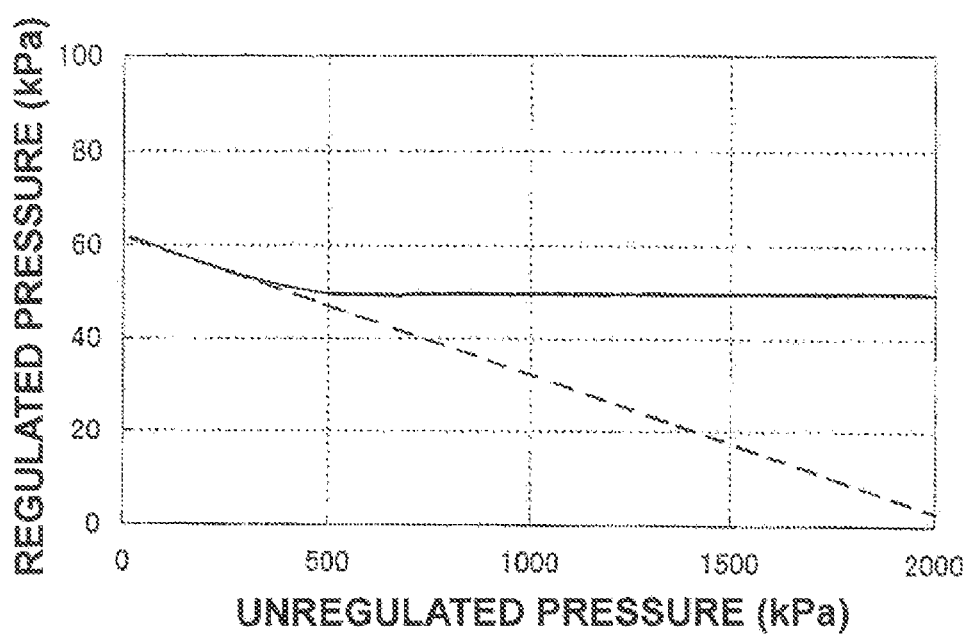
FIG. 6 is a graph showing the results of measurement of a variation in regulated pressure, which results were obtained with the pressure regulator shown in FIG. 5 in cases where an unregulated pressure of a high-pressure gas supplied to the pressure regulator shown in FIG. 5 was altered, and the results of measurement of a variation in regulated pressure, which results were obtained with the pressure regulator of the comparative example in cases where the unregulated pressure of the high-pressure gas supplied to the pressure regulator of the comparative example was altered.
Figure 7:
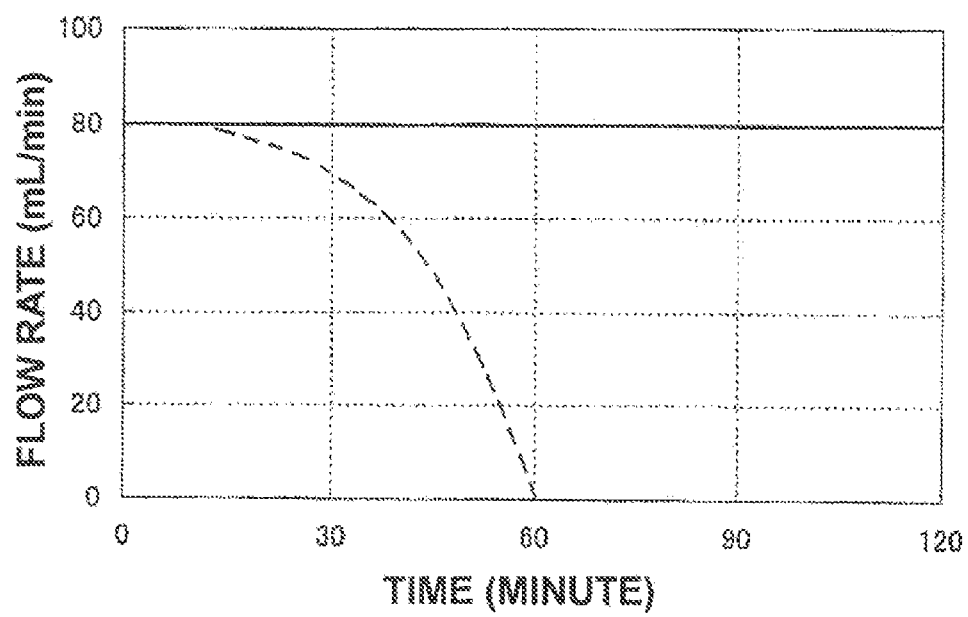
FIG. 7 is a graph showing the results of measurement of a variation in gas flow rate with respect to the passage of time, which results were obtained with the pressure regulator shown in FIG. 5 in cases where a dimethyl ether gas was utilized as the high-pressure gas supplied to the pressure regulator shown in FIG. 5, and the results of measurement of a variation in gas flow rate with respect to the passage of time, which results were obtained with the pressure regulator of the comparative example in cases where the dimethyl ether gas was utilized as the high-pressure gas supplied to the pressure regulator of the comparative example.
Figure 8:
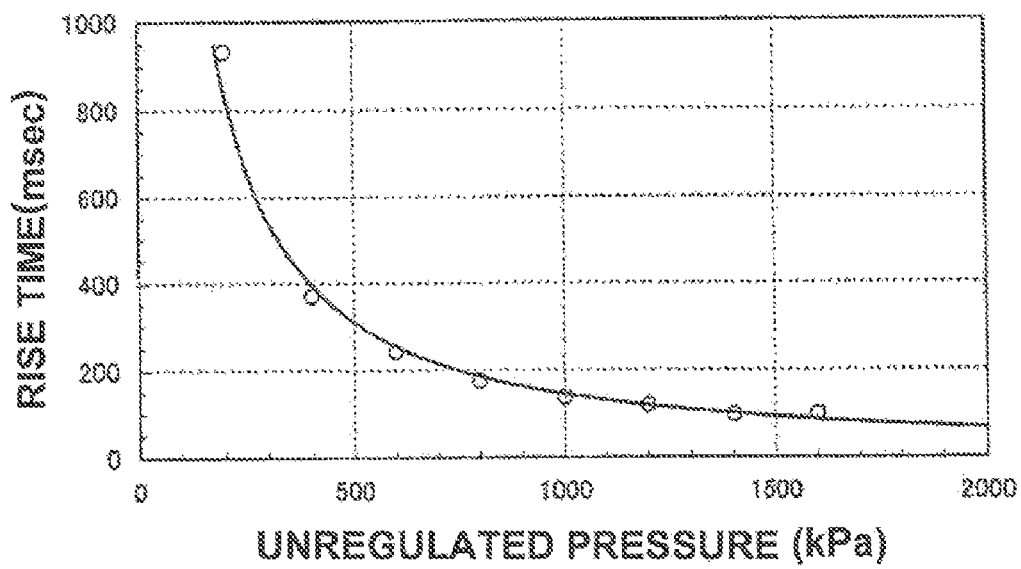
FIG. 8 is a graph showing the results of measurement of a rise time occurring between when introduction of a high-pressure gas having an unregulated pressure into the pressure regulator shown in FIG. 5 was begun and when a regulated pressure obtained with the pressure regulator shown in FIG. 5 became stable, which results were obtained in cases where the unregulated pressure was altered.
Figure 9:
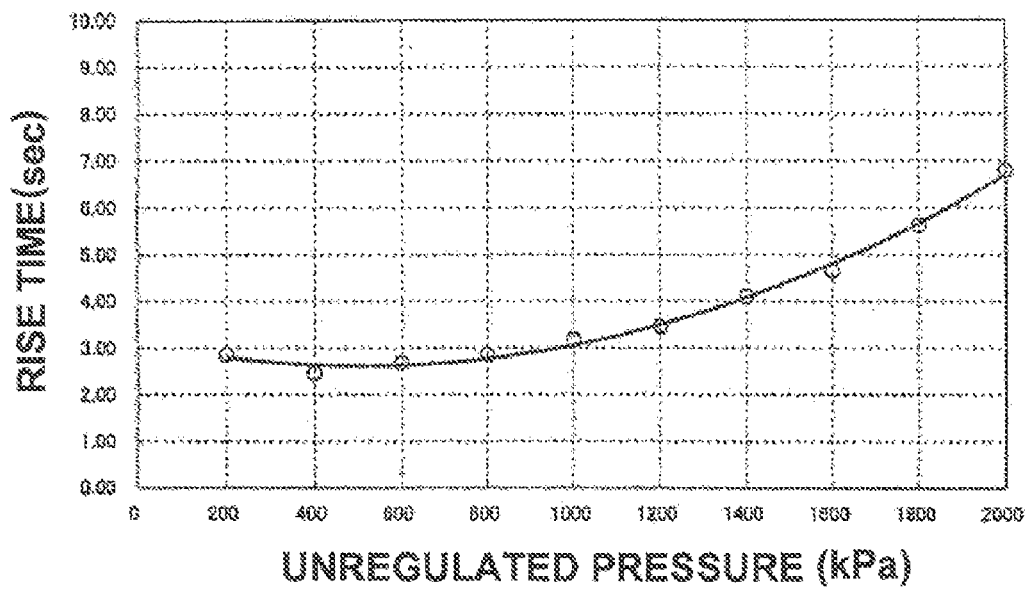
FIG. 9 is a graph showing the results of measurement of a rise time occurring between when introduction of the high-pressure gas having the unregulated pressure into a pressure regulator of a different comparative example was begun and when the regulated pressure obtained with the pressure regulator of the different comparative example became stable, which results were obtained in cases where the unregulated pressure was altered.

The results of experiments conducted for evaluating the pressure regulating effects of the second embodiment of the pressure regulator in accordance with the present invention (i.e., the pressure regulator 300 having the structure illustrated in FIG. 5) and the results of experiments conducted for evaluating the pressure regulating effects of pressure regulators of comparative examples (i.e, the single-valve type pressure regulator 500 illustrated in FIG. 14 in the comparative examples in Measurement Examples 3 and 4 described below, and a pressure regulator comprising two single-valve type pressure regulators connected in series in a different comparative example in Measurement Example 5 described below) will be described hereinbelow with reference to FIG. 6, FIG. 7, FIG. 8, and FIG. 9. FIG. 6 is a graph showing the results of measurement of a variation in regulated pressure, which results were obtained with the pressure regulator 300 shown in FIG. 5 in cases where an unregulated pressure of a high-pressure gas supplied to the pressure regulator 300 shown in FIG. 5 was altered, and the results of measurement of a variation in regulated pressure, which results were obtained with the single-valve type pressure regulator 500 of the comparative example in cases where the unregulated pressure of the high-pressure gas supplied to the pressure regulator 500 of the comparative example was altered. FIG. 7 is a graph showing the results of measurement of a variation in gas flow rate with respect to the passage of time, which results were obtained with the pressure regulator 300 shown in FIG. 5 in cases where a dimethyl ether gas was utilized as the high-pressure gas supplied to the pressure regulator 300 shown in FIG. 5, and the results of measurement of a variation in gas flow rate with respect to the passage of time, which results were obtained with the pressure regulator 500 of the comparative example in cases where the dimethyl ether gas was utilized as the high-pressure gas supplied to the pressure regulator 500 of the comparative example. FIG. 8 is a graph showing the results of measurement of a rise time occurring between when introduction of a high-pressure gas having an unregulated pressure into the pressure regulator 300 shown in FIG. 5 was begun and when a regulated pressure obtained with the pressure regulator 300 shown in FIG. 5 became stable, which results were obtained in cases where the unregulated pressure was altered. FIG. 9 is a graph showing the results of measurement of a rise time occurring between when introduction of the high-pressure gas having the unregulated pressure into a pressure regulator of a different comparative example was begun and when the regulated pressure obtained with the pressure regulator of the different comparative example became stable, which results were obtained in cases where the unregulated pressure was altered.

MEASUREMENT EXAMPLE 3

In Measurement Example 3, measurement was made to find a variation in regulated pressure in cases where an unregulated pressure of a high-pressure gas (an inert gas) supplied to each of the pressure regulators was altered. The results of the measurement obtained with the pressure regulator 300 of FIG. 5 in the example in accordance with the present invention are indicated by the solid line in FIG. 6. Also, the results of the measurement obtained with the single-valve type pressure regulator 500 of FIG. 14 in the comparative example are indicated by the broken line in FIG. 6.

In both the example in accordance with the present invention and the comparative example, the regulated pressure was set by the adjustment of the pressure regulating screw 352 of the pressure setting section 350 or the pressure regulating screw 509b of the pressure setting section 509, such that, when the unregulated pressure was equal to 400 kPa (corresponding to the vapor pressure of the dimethyl ether gas at a temperature of approximately 23° C.), the regulated pressure became equal to 50 kPa. At this time, the gas flow rate was equal to 80 mL/min.

As indicated by the solid line in the graph of FIG. 6, with the pressure regulator 300 of FIG. 5 in accordance with the present invention, in cases where the unregulated pressure was altered over the range of 50 kPa to 2000 kPa (corresponding to the range of the variation in vapor pressure of the dimethyl ether gas at temperatures ranging from approximately 0° C. to approximately 80° C.), the pressure regulation characteristics with respect to the low unregulated pressure were identical with the pressure regulation characteristics of the single-valve type pressure regulator 500 of FIG. 14 in the comparative example. However, with the pressure regulator 300 of FIG. 5 in accordance with the present invention, as the unregulated pressure became high, the regulated pressure did not vary and was kept at approximately the set value (50 kPa), and the predetermined regulated pressure was kept.

However, as indicated by the broken line in the graph of FIG. 6, with the single-valve type pressure regulator 500 of FIG. 14 in the comparative example, in cases where the unregulated pressure fell within the region lower than 400 kPa, the regulated pressure was higher than the set value (50 kPa). Also, in cases where the unregulated pressure fell within the region higher than 400 kPa, the regulated pressure varied such that the regulated pressure became lower than the set value (50 kPa), and such that, as the unregulated pressure became high, the regulated pressure became low as a whole. In this manner, with the single-valve type pressure regulator 500 of FIG. 14 in the comparative example, the regulated pressure was not capable of being kept at the predetermined pressure.

MEASUREMENT EXAMPLE 4

In Measurement Example 4, measurement was made to find a variation in gas flow rate with respect to the passage of time in cases where a dimethyl ether gas, which was a typical gas causing an elastic material (a rubber material) to swell, was utilized as the high-pressure gas supplied to each of the pressure regulators. The results of the measurement obtained with the pressure regulator 300 of FIG. 5 in the example in accordance with the present invention are indicated by the solid line in FIG. 7. Also, the results of the measurement obtained with the single-valve type pressure regulator 500 of FIG. 14 in the comparative example are indicated by the broken line in FIG. 7. The initial flow rate of the dimethyl ether gas was equal to 80 mL/min. The test was conducted at a temperature, at which the vapor pressure was equal to 400 kPa.

As indicated by the solid line in the graph of FIG. 7, with the pressure regulator 300 of FIG. 5 in accordance with the present invention, in cases where a period of time of as long as 120 minutes had elapsed, the flow rate of the discharged gas did not vary and was kept at the initial flow rate. It was capable of being confirmed that, with the pressure regulator 300 of FIG. 5 in accordance with the present invention, even though the O-rings were subjected to the swelling due to the contact with the gas, adverse effects upon the gas flow rate did not occur.

However, as indicated by the broken line in the graph of FIG. 7, with the single-valve type pressure regulator 500 of FIG. 14 in the comparative example, due to a variation in valve space accompanying the swelling of the valve seat 506b constituted of the elastic body, the gas flow rate begun becoming low at the time at which a period of time of approximately 15 minutes had elapsed after the start of the measurement. Thereafter, the gas flow rate became markedly low with the passage of time. At the time at which a period of time of approximately 60 minutes had elapsed after the start of the measurement, the gas flow rate became 0 (zero), and the gas could not be discharged any more.

MEASUREMENT EXAMPLE 5

In Measurement Example 5, a cock was installed at a stage prior to the gas introducing port 313 of the pressure regulator 300 of FIG. 5 or the gas introducing port of the pressure regulator in the different comparative example. Also, the cock was quickly operated from a closed state into an open state, and the gas introduction was thus begun. At this time, measurement was made to find a rise time occurring between when the introduction of the high-pressure gas having an unregulated pressure into the pressure regulator 300 shown in FIG. 5 or the pressure regulator of the different comparative example was begun and when a regulated pressure obtained with the pressure regulator became stable, while the unregulated pressure was being set at various values. The results of the measurement obtained with the pressure regulator 300 of FIG. 5 in the example in accordance with the present invention are shown in FIG. 8. Also, the results of the measurement obtained with the pressure regulator of the different comparative example are shown in FIG. 9. The pressure regulator of the different comparative example comprised a combination of a single-valve type pressure regulator for high pressures and a single-valve type pressure regulator for low pressures, which pressure regulators were connected in series. The pressure regulator of the different comparative example had been reported to be capable of accurately keeping the regulated pressure with respect to a wide unregulated pressure range.

As clear from the graph of FIG. 8, with the pressure regulator 300 of FIG. 5 in accordance with the present invention, in cases where the unregulated pressure fell within the high pressure range of at least 400 kPa, the rise time was as short as 0.4 second, the regulated pressure quickly became stable, and high response characteristics were obtained. Also, as the unregulated pressure became high, the rise time became shorter, and the regulated pressure became stable more quickly. It was thus confirmed that, with the pressure regulator 300 of FIG. 5 in accordance with the present invention, a high follow-up speed with respect to marked fluctuation in unregulated pressure was capable of being obtained.

However, as shown in FIG. 9, with the pressure regulator of the different comparative example described above, a period of time of several seconds occurred before the regulated pressure became stable with the operation of each of the two single-valve type pressure regulators.

The response characteristics were thus worse than the response characteristics of the pressure regulator 300 of FIG. 5 in accordance with the present invention. Also, as the unregulated pressure became high, the rise time was apt to become long.

Figure 10:
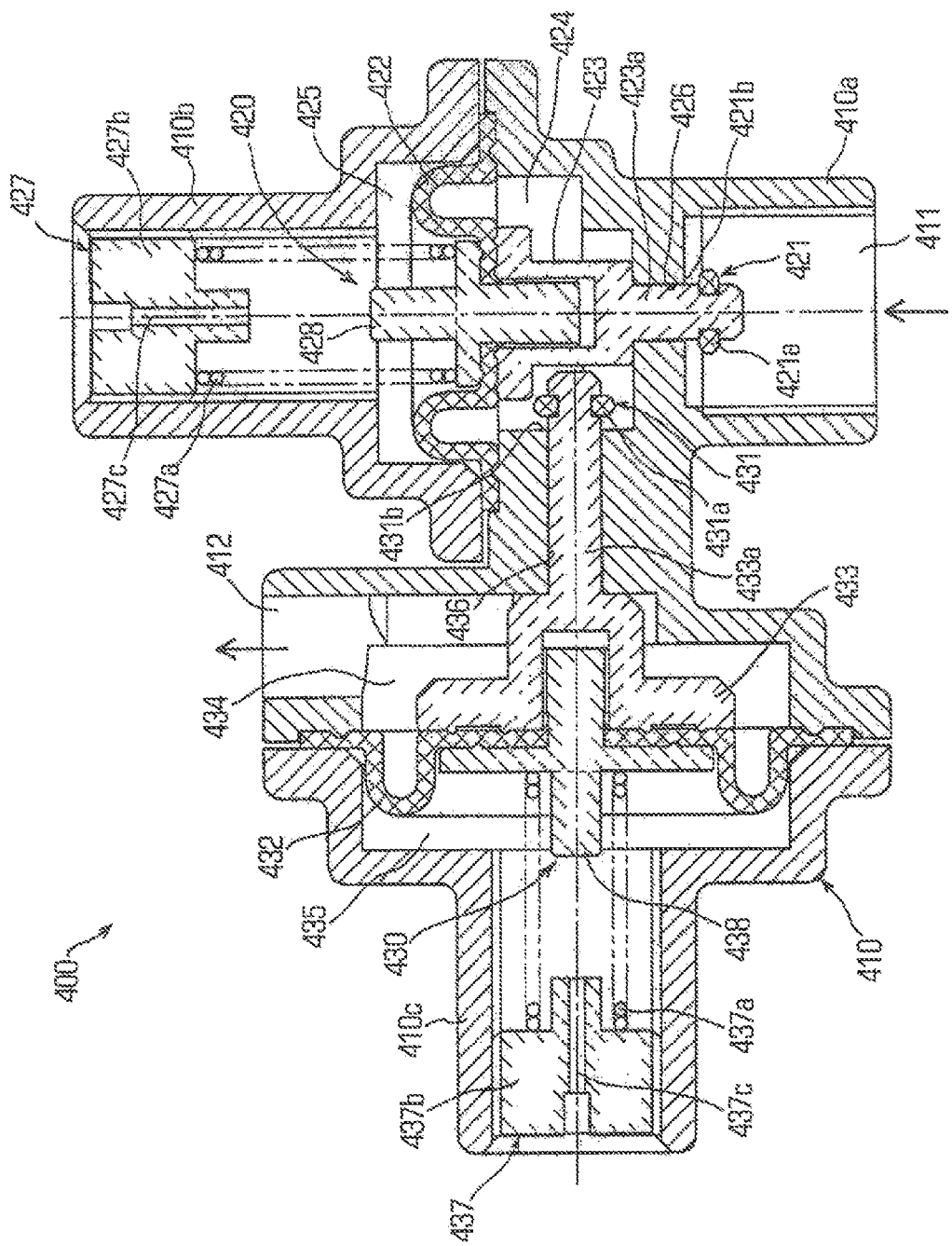
FIG. 10 is a sectional view showing a third embodiment of the pressure regulator in accordance with the present invention.

A third embodiment of the pressure regulator in accordance with the present invention will be described hereinbelow. FIG. 10 is a sectional view showing a third embodiment of the pressure regulator in accordance with the present invention.

With reference to FIG. 10, a pressure regulator 400, which is the third embodiment of the pressure regulator in accordance with the present invention, is used for the stabilization of fuel supply to solid oxide type fuel cells (SOFC's) and solid polymer type fuel cells (PEFC's). Also, a dimethyl ether gas is utilized as the high-pressure gas to be supplied to the pressure regulator 400. The pressure regulator 400 comprises a first-stage governor system 420, which is provided with a first regulating valve 421 for reducing an unregulated pressure of the introduced gas into an intermediate pressure. The pressure regulator 400 also comprises a second-stage governor system 430, which is provided with a second regulating valve 431 for reducing the intermediate pressure to a regulated pressure.

Also, the first-stage governor system 420 and the second-stage governor system 430 are located such that the direction of the displacement of a first diaphragm 422 for operating the first regulating valve 421 of the first-stage governor system 420 (i.e., the directions of the valve opening and closing operations of the first regulating valve 421) and the direction of the displacement of a second diaphragm 432 for operating the second regulating valve 431 of the second-stage governor system 430 (i.e., the directions of the valve opening and closing operations of the second regulating valve 431) intersect with each other.

Specifically, the first-stage governor system 420 comprises the first diaphragm 422, which partitions off a part of a region within a casing 410 into a first pressure regulating chamber 424 and a first atmospheric chamber 425. The first-stage governor system 420 also comprises a gas introducing port 411, through which the high-pressure gas having the unregulated pressure is introduced into the first-stage governor system 420. The first-stage governor system 420 further comprises the first regulating valve 421, which operates by being interlocked with the first diaphragm 422. The first regulating valve 421 performs operations for opening and closing a gas flow path 426, through which the gas introducing port 411 and the first pressure regulating chamber 424 communicate with each other. The first regulating valve 421 thus performs first-stage pressure reduction and regulation for reducing the unregulated pressure of the high-pressure gas within the gas introducing port 411 to the intermediate pressure. The first-stage governor system 420 still further comprises a first plunger 423, by which the first diaphragm 422 and the first regulating valve 421 are linked and interlocked with each other. The first-stage governor system 420 also comprises a first pressure setting section 427 for adjusting the quantity of the displacement of the first diaphragm 422.

The first pressure regulating chamber 424 is capable of relaxing pressure vibration of the gas, which has passed through the first regulating valve 421. The first diaphragm 422 receives the intermediate pressure within the first pressure regulating chamber 424 and is thus displaced. The first diaphragm 422 operates the first regulating valve 421 via the first plunger 423.

The second-stage governor system 430 comprises the second diaphragm 432, which partitions off a part of the region within the casing 410 into a second pressure regulating chamber 434 and a second atmospheric chamber 435. The second-stage governor system 430 also comprises the second regulating valve 431, which operates by being interlocked with the second diaphragm 432. The second regulating valve 431 performs operations for opening and closing an opening of a gas flow path 436, through which the first pressure regulating chamber 424 and the second pressure regulating chamber 434 communicate with each other. The second regulating valve 431 thus performs second-stage pressure reduction and regulation for reducing the intermediate pressure within the first pressure regulating chamber 424 to the regulated pressure. The second-stage governor system 430 further comprises a second plunger 433, by which the second diaphragm 432 and the second regulating valve 431 are linked and interlocked with each other. The second-stage governor system 430 still further comprises a second pressure setting section 437 for adjusting the quantity of the displacement of the second diaphragm 432. The second-stage governor system 430 also comprises a gas discharging port 412, through which the gas having been subjected to the pressure regulation within the second pressure regulating chamber 434 and having the regulated pressure is discharged.

The second pressure regulating chamber 434 is capable of relaxing pressure vibration of the gas, which has passed through the second regulating valve 431. The second diaphragm 432 receives the regulated pressure within the second pressure regulating chamber 434 and is thus displaced. The second diaphragm 432 operates the second regulating valve 431 via the second plunger 433.

The first plunger 423 and the second plunger 433 are located such that the first plunger 423 and the second plunger 433 extend in directions which intersect at right angles with each other. A part of the first plunger 423 is inserted for sliding movement into the gas flow path 426 extending from the gas introducing port 411 to the first pressure regulating chamber 424. A valve body 421a of the first regulating valve 421, which is fitted onto a region in the vicinity of an end of the first plunger 423, is located within the gas introducing port 411. Also, a part of the second plunger 433 is inserted for sliding movement into the gas flowpath 436 extending from the first pressure regulating chamber 424 to the second pressure regulating chamber 434. A valve body 431a of the second regulating valve 431, which is fitted onto a region in the vicinity of an end of the second plunger 433, is located within the first pressure regulating chamber 424.

Further, each of the valve body 421a of the first regulating valve 421 and the valve body 431a of the second regulating valve 431 is constituted of an elastic body formed from a urethane type rubber material, which elastic body takes on the form of an O-ring. The valve body 421a constituted of the elastic body is supported in a peripheral groove section of the first plunger 423, such that the valve body 421a does not undergo swelling deformation in the directions of valve opening and closing movements, i.e. such that the direction of the swelling deformation of the valve body 421a becomes different from the directions of valve opening and closing operations (in this embodiment, such that the direction of the swelling deformation of the valve body 421a is normal to the directions of valve opening and closing operations). Also, the valve body 431a constituted of the elastic body is supported in a peripheral groove section of the second plunger 433, such that the valve body 431a does not undergo swelling deformation in the directions of valve opening and closing movements, i.e. such that the direction of the swelling deformation of the valve body 431a becomes different from the directions of valve opening and closing operations (in this embodiment, such that the direction of the swelling deformation of the valve body 431a is normal to the directions of valve opening and closing operations). Therefore, the dimethyl ether gas, or the like, which will have adverse effects, such as swelling effects, upon the elastic body, is capable of being used as the high-pressure gas.

The first diaphragm 422 of the first-stage governor system 420 has an outside diameter smaller than the outside diameter of the second diaphragm 432 of the second-stage governor system 430. The pressure receiving area of the first diaphragm 422 of the first-stage governor system 420 is thus set to be smaller than the pressure receiving area of the second diaphragm 432 of the second-stage governor system 430.

The structure of the pressure regulator 400 will hereinbelow be described in more detail. The casing 410 described above comprises a casing main body section 410a, a first cover section 410b of the first-stage governor system 420, and a second cover section 410c of the second-stage governor system 430.

A subsection of the casing main body section 410a, at which subsection the first-stage governor system 420 is located, is provided with a depressed region, which acts as the gas introducing port 411, and a depressed region, which is formed on the side opposite to the gas introducing port 411 and acts as the first pressure regulating chamber 424. The gas flow path 426, through which the gas introducing port 411 and the first pressure regulating chamber 424 communicate with each other, is formed through the center areas of the two depressed regions. The first cover section 410b has a hollow inside region, which acts as the first atmospheric chamber 425. The first cover section 410b is joined to the casing main body section 410a with the first diaphragm 422 intervening between the first cover section 410b and the casing main body section 410a. In this manner, the first pressure regulating chamber 424 and the first atmospheric chamber 425 are partitioned off from each other by the first diaphragm 422.

Also, a subsection of the casing main body section 410a, at which subsection the second-stage governor system 430 is located, is provided with a depressed region, which acts as the second pressure regulating chamber 434. The gas discharging port 412, which is open to the exterior, is formed along a side of the depressed region. Further, the gas flow path 436, through which the second pressure regulating chamber 434 and the first pressure regulating chamber 424 communicate with each other, is formed through the center area of the bottom part defining the depressed region. The second cover section 410c has a hollow inside region, which acts as the second atmospheric chamber 435. The second cover section 410c is joined to the casing main body section 410a with the second diaphragm 432 intervening between the second cover section 410c and the casing main body section 410a. In this manner, the second pressure regulating chamber 434 and the second atmospheric chamber 435 are partitioned off from each other by the second diaphragm 432. The first pressure regulating chamber 424 has a certain level of volume and performs relaxation of pressure vibration of the gas, which has passed through the first regulating valve 421. Also, the second pressure regulating chamber 434 has a certain level of volume and performs relaxation of pressure vibration of the gas, which has passed through the second regulating valve 431.

As described above, the first diaphragm 422 and the second diaphragm 432 have the different outside diameters. However, the first diaphragm 422 receives the intermediate pressure within the first pressure regulating chamber 424 and is thus capable of undergoing the elastic displacement in accordance with the pressure difference between the first pressure regulating chamber 424 and the first atmospheric chamber 425. Also, the second diaphragm 432 receives the regulated pressure within the second pressure regulating chamber 434 and is thus capable of undergoing the elastic displacement in accordance with the pressure difference between the second pressure regulating chamber 434 and the second atmospheric chamber 435. The center area of the first diaphragm 422 is linked and secured to the first plunger 423, which is located on the side of the casing main body section 410a, and a first supporter 428, which is located on the side of the first cover section 410b. The first plunger 423 and the first supporter 428 are capable of moving together in the axial direction in accordance with the displacement of the first diaphragm 422. Also, the center area of the second diaphragm 432 is linked and secured to the second plunger 433, which is located on the side of the casing main body section 410a, and a second supporter 438, which is located on the side of the second cover section 410c. The second plunger 433 and the second supporter 438 are capable of moving together in the axial direction in accordance with the displacement of the second diaphragm 432.

The first plunger 423 is provided with a shaft section 423a, which extends in a rod-like shape at the end region of the first plunger 423. The shaft section 423a is provided with a peripheral groove section, which is formed at a position in the vicinity of the end of the shaft section 423a. The valve body 421a of the first regulating valve 421, which valve body is constituted of the O-ring (i.e., the elastic body), is fitted into the peripheral groove section of the shaft section 423a. Also, the second plunger 433 is provided with a shaft section 433a, which extends in a rod-like shape at the end region of the second plunger 433. The shaft section 433a is provided with a peripheral groove section, which is formed at a position in the vicinity of the end of the shaft section 433a. The valve body 431a of the second regulating valve 431, which valve body is constituted of the O-ring (i.e., the elastic body), is fitted into the peripheral groove section of the shaft section 433a.

One end section of a pressure regulating spring 427a of the first pressure setting section 427, which is located within a tubular section of the first cover section 410b, is brought into abutment with a flange section of the first supporter 428. The first supporter 428 thus receives the pressure setting load. The other end section of the pressure regulating spring 427a is brought into abutment with a first pressure regulating screw (adjustor) 427b, which is engaged by threads with an inside wall of the tubular section of the first cover section 410b such that the position of the first pressure regulating screw 427b is capable of being adjusted. The urging force of the pressure regulating spring 427a acting upon the first diaphragm 422 is adjusted in accordance with the adjustment of the position of the first pressure regulating screw 427b with respect to the axial direction of the tubular section of the first cover section 410b. A center area of the first pressure regulating screw 427b has a communication through-hole 427c, which passes through the center area of the first pressure regulating screw 427b in the axial direction of the first pressure regulating screw 427b. Through the communication through-hole 427c of the first pressure regulating screw 427b, the first atmospheric chamber 425 is open to the ambient atmosphere.

Also, one end section of a pressure regulating spring 437a of the second pressure setting section 437, which is located within a tubular section of the second cover section 410c, is brought into abutment with a flange section of the second supporter 438. The second supporter 438 thus receives the pressure setting load. The other end section of the pressure regulating spring 437a is brought into abutment with a second pressure regulating screw (adjustor) 437b, which is engaged by threads with an inside wall of the tubular section of the second cover section 410c such that the position of the second pressure regulating screw 437b is capable of being adjusted. The urging force of the pressure regulating spring 437a acting upon the second diaphragm 432 is adjusted in accordance with the adjustment of the position of the second pressure regulating screw 437b with respect to the axial direction of the tubular section of the second cover section 410c. A center area of the second pressure regulating screw 437b has a communication through-hole 437c, which passes through the center area of the second pressure regulating screw 437b in the axial direction of the second pressure regulating screw 437b. Through the communication through-hole 437c of the second pressure regulating screw 437b, the second atmospheric chamber 435 is open to the ambient atmosphere.

The gas introducing port 411 of the casing main body section 410a is connected to a connector (not shown) for introducing the high-pressure gas, such as the dimethyl ether gas, which is supplied from a gas cylinder, or the like. The gas flow path 426, through which the gas introducing port 411 and the first pressure regulating chamber 424 communicate with each other, is opened and closed by the first regulating valve 421. The shaft section 423a of the first plunger 423 is inserted for sliding movement into gas flow path 426. The valve body 421a of the first regulating valve 421 stands facing the gas introducing port 411. An area of a wall of the casing main body section 410a, which area stands facing the gas introducing port 411 and is located in the vicinity of and around the gas flow path 426, acts as a valve seat 421b of the first regulating valve 421.

In accordance with the movement of the first plunger 423, the valve body 421a of the first regulating valve 421 comes into close contact with the valve seat 421b and closes the gas flow path 426. In cases where the valve body 421a of the first regulating valve 421 moves away from the valve seat 421b and opens the gas flow path 426 in accordance with the movement of the first plunger 423, a quantity of the gas in accordance with the quantity of the opening of the gas flow path 426 passes through the space between the inside peripheral surface of the wall defining the gas flow path 426 and the outside peripheral surface of the first plunger 423 and flows from the gas introducing port 411 into the first pressure regulating chamber 424.

Also, the gas flow path 436, which extends through the center area of the bottom part of the second pressure regulating chamber 434 of the casing main body section 410a, is opened and closed by the second regulating valve 431. The shaft section 433a of the second plunger 433 is inserted for sliding movement into the gas flow path 436. The valve body 431a of the second regulating valve 431 stands facing the first pressure regulating chamber 424. An area of a wall of the casing main body section 410a, which area stands facing the first pressure regulating chamber 424 and is located in the vicinity of and around the gas flow path 436, acts as a valve seat 431b of the second regulating valve 431.

In accordance with the movement of the second plunger 433, the valve body 431a of the second regulating valve 431 comes into close contact with the valve seat 431b and closes the gas flow path 436. In cases where the valve body 431a of the second regulating valve 431 moves away from the valve seat 431b and opens the gas flow path 436 in accordance with the movement of the second plunger 433, a quantity of the gas in accordance with the quantity of the opening of the gas flow path 436 passes through the space between the inside peripheral surface of the wall defining the gas flow path 436 and the outside peripheral surface of the second plunger 433 and flows from the first pressure regulating chamber 424 into the second pressure regulating chamber 434.

Each of the first plunger 423, the second plunger 433, the first supporter 428, and the second supporter 438 may be constituted of a light metal or a light metal alloy, such as aluminum or duralumin. Alternatively, each of the first plunger 423, the second plunger 433, the first supporter 428, and the second supporter 438 may be constituted of a polyamide (PA), a polyacetal (POM), a polybutylene terephthalate (PBT), or a polypropylene (PP), which is a crystalline resin. As another alternative, each of the first plunger 423, the second plunger 433, the first supporter 428, and the second supporter 438 may be constituted of an acetal, a polycarbonate, or acrylonitrile-butadiene-styrene, which is a non-crystalline resin, the non-crystalline resin having a surface coated with an epoxy resin or a polyamide resin. In cases where each of the first plunger 423, the second plunger 433, the first supporter 428, and the second supporter 438 is constituted of one of the materials enumerated above, each of the first plunger 423, the second plunger 433, the first supporter 428, and the second supporter 438 is capable of being kept light in weight and imparted with the resistance to the dimethyl ether gas.

Also, the casing 410 (i.e., the casing main body section 410a, the first cover section 410b, and the second cover section 410c) may be constituted of a resin. Examples of the preferable resins include those described above for the casing 310 in the second embodiment.

In cases where each of the first plunger 423, the second plunger 433, the first supporter 428, and the second supporter 438 is kept light in weight, the response characteristics of the first regulating valve 421 with respect to the displacement of the first diaphragm 422 and the response characteristics of the second regulating valve 431 with respect to the displacement of the second diaphragm 432 are capable of being enhanced, and the chattering phenomenon is capable of being prevented from occurring. Specifically, the first plunger 423, to which the first regulating valve 421 is fitted, and the first supporter 428 are secured to the first diaphragm 422. Also, the second plunger 433, to which the second regulating valve 431 is fitted, and the second supporter 438 are secured to the second diaphragm 432. Therefore, if the weight of each of the first plunger 423, the second plunger 433, the first supporter 428, and the second supporter 438 is heavy, the response characteristics of the first regulating valve 421 with respect to the displacement of the first diaphragm 422 and the response characteristics of the second regulating valve 431 with respect to the displacement of the second diaphragm 432 will become bad. Also, due to excessive inertia force, the quantity of the displacement of each of the first diaphragm 422 and the second diaphragm 432 will become larger than the quantity of the displacement in accordance with the pressure difference, and excessive displacement of each of the first diaphragm 422 and the second diaphragm 432 will then occur in the reverse direction. The excessive displacement of the each of the first diaphragm 422 and the second diaphragm 432 will thus be iterated, and the vibration (the chattering phenomenon) will be caused to occur. Therefore, the weight of each of the constituent parts should be kept as light as possible. Actually, in cases where each of the first plunger 423, the second plunger 433, the first supporter 428, and the second supporter 438 is constituted of aluminum, duralumin, or the resin, the chattering phenomenon does not occur.

Also, in cases where the casing 410 is constituted of the resin, the casing 410 is capable of being kept light in weight and low in cost. In particular, in cases where the casing 410 is constituted of the resin, which is capable of being subjected to the ultrasonic bonding, the assembly operation is capable of being facilitated. Specifically, if the entire casing 410 is constituted of a metal or a diecast metal, the weight of the entire casing 410 will become heavy, and the cost of the casing 410 will become high. Also, since it is necessary for the operation for securing with screws to be performed, the assembly operation cannot be kept easy. In cases where the casing 410 is constituted of the resin as described above, the casing 410 is capable of being kept light in weight and low in cost. Also, since the casing 410 is capable of being formed with the ultrasonic bonding, the operation for assembling the casing 410 is capable of being performed easily.

If the members, such as the casing 410, the first plunger 423, the second plunger 433, the first supporter 428, and the second supporter 438, which come into direct contact with the gas, are constituted of a metal, in cases where the high-pressure gas is primarily the dimethyl ether gas, or the like, which has the high dissolving characteristics, a slight amount of a metal ion will be dissolved out into the gas and will adversely affect the appliances to which the gas having been subjected to the pressure regulation is supplied. From this point of view, each of the casing 410, the first plunger 423, the second plunger 433, the first supporter 428, and the second supporter 438 should preferably be constituted of the resin.

Specifically, it is expected that the dimethyl ether gas is capable of being used as the fuel for the solid oxide type fuel cells (SOFC's) and the solid polymer type fuel cells (PEFC's). In both the cases of the solid oxide type fuel cells (SOFC's) and the solid polymer type fuel cells (PEFC's), it is markedly undesirable that metal ions are present in the dimethyl ether gas supplied as the fuel. Therefore, the aforesaid structure constituted of the resin should preferably be employed.

With the first-stage governor system 420, in accordance with the displacement of the first diaphragm 422, the first regulating valve 421 operates in order to reduce and regulate the unregulated pressure into the intermediate pressure regardless of the fluctuation in unregulated pressure. Also, with the second-stage governor system 430, in accordance with the displacement of the second diaphragm 432, the second regulating valve 431 operates in order to reduce and regulate the intermediate pressure into the predetermined regulated pressure. The unregulated pressure is thus reduced and regulated into the predetermined regulated pressure via the intermediate pressure regardless of the fluctuation in unregulated pressure. How the first-stage governor system 420 and the second-stage governor system 430 operate will be described hereinbelow.

Firstly, the gas having flowed from the gas introducing port 411 passes through the first regulating valve 421 and flows through the gas flow path 426 into the first pressure regulating chamber 424, and the unregulated pressure of the gas is thus reduced to the intermediate pressure. The gas having the intermediate pressure within the first pressure regulating chamber 424 passes through the second regulating valve 431 and flows through the gas flow path 436 into the second pressure regulating chamber 434, and the intermediate pressure is thus reduced to the regulated pressure. The gas having the regulated pressure is discharged through the gas discharging port 412.

The first diaphragm 422 is supported by the first plunger 423 and the first supporter 428. The first diaphragm 422 is kept at the position, at which the force due to the pressure difference between the intermediate pressure and the atmospheric pressure and the urging force of the pressure regulating spring 427a are balanced with each other. Also, the second diaphragm 432 is supported by the second plunger 433 and the second supporter 438.

The second diaphragm 432 is kept at the position, at which the force due to the pressure difference between the regulated pressure and the atmospheric pressure and the urging force of the pressure regulating spring 437a are balanced with each other. In cases where the intermediate pressure or the regulated pressure varies in accordance with the variation in unregulated pressure, a variation in quantity of the gas discharged from the gas discharging port 412, and the like, the quantity of the displacement of the first diaphragm 422 or the quantity of the displacement of the second diaphragm 432 varies in accordance with the variation in intermediate pressure or the regulated pressure. The first plunger 423 and the second plunger 433 move in accordance with the variation in quantity of the displacement. Also, the first regulating valve 421 and the second regulating valve 431 perform the valve opening and closing operations in accordance with the movements of the first plunger 423 and the second plunger 433 and keep the intermediate pressure and the regulated pressure at the predetermined values. The urging force of the pressure regulating spring 427a is capable of being varied by the adjustment of the position of the first pressure regulating screw 427b of the first pressure setting section 427, and the intermediate pressure is thus capable of being set at an arbitrary pressure. Also, the urging force of the pressure regulating spring 437a is capable of being varied by the adjustment of the position of the second pressure regulating screw 437b of the second pressure setting section 437, and the regulated pressure is thus capable of being set at an arbitrary pressure.

Also, each of the valve body 421a of the first regulating valve 421 and the valve body 431a of the second regulating valve 431 is constituted of the elastic body, which is formed as the O-ring. Therefore, in cases where the gas having the high dissolving characteristics, such as the dimethyl ether gas, is introduced into the pressure regulator 400, and each of the O-rings is brought into contact with the gas having the high dissolving characteristics and undergoes swelling and expansion in volume, the variation in volume of each of the O-rings is restricted so as to occur only in the direction, which is normal to the directions of valve opening and closing movements. Accordingly, the variation in pressure regulation and the variation in gas flow rate due to the expansion in volume of each of the O-rings are capable of being suppressed.

Further, since the first-stage governor system 420 and the second-stage governor system 430 are located in the orientations which intersect at right angles with each other, the gas flow paths are capable of being kept simple and small in size. The first diaphragm 422 having a small outside diameter enables the size of the entire pressure regulator 400 to be reduced even further. Furthermore, the accuracy with which the pressure regulation to the regulated pressure is conducted ultimately is capable of being obtained with the operation of the second diaphragm 432. Specifically, the pressure reduction from the unregulated pressure to the regulated pressure is performed in two stages by the first regulating valve 421 and the second regulating valve 431. Therefore, the extent of the pressure reduction occurring at each of the two regulating valves 421 and 431 is capable of being kept to be smaller than the extent of the pressure reduction, which occurs in cases where the pressure reduction is performed with only one regulating valve. Accordingly, the problems are capable of being prevented from occurring in that, due to the high degree of the required pressure reduction, the valve space between the valve body and the valve seat is set to be markedly small. As a result, reliable performance is capable of being obtained.

In the third embodiment described above, each of the valve body 421a of the first regulating valve 421 and the valve body 431a of the second regulating valve 431 is constituted of the elastic body, which is formed as the O-ring. Alternatively, each of the valve seat 421b of the first regulating valve 421 and the valve seat 431b of the second regulating valve 431 may be constituted of the elastic body, which is formed as the O-ring. In such cases, each of the elastic body acting as the valve seat 421b and the elastic body acting as the valve seat 431b is located in a state in which the elastic body is controlled by a peripheral groove structure, or the like, such that the elastic body is prevented from deforming with respect to the directions of valve opening and closing movements. As another alternative, an elastic body other than the O-ring may be employed.

Figure 11:
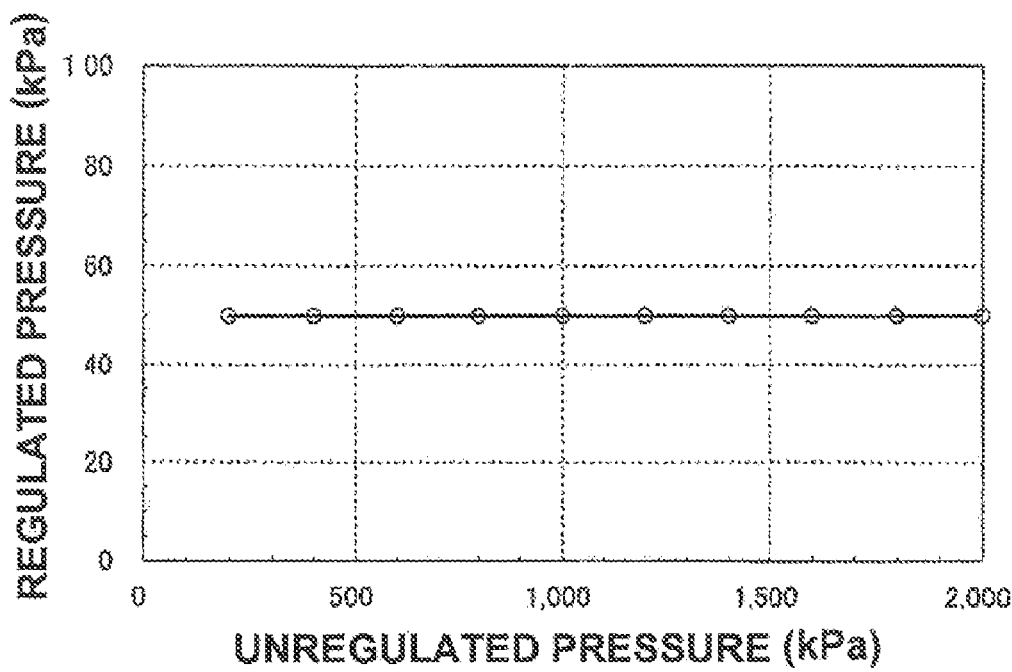
FIG. 11 is a graph showing the results of measurement of a variation in regulated pressure, which results were obtained with the pressure regulator shown in FIG. 10 in cases where an unregulated pressure of a high-pressure gas supplied to the pressure regulator shown in FIG. 10 was altered.
Figure 12:
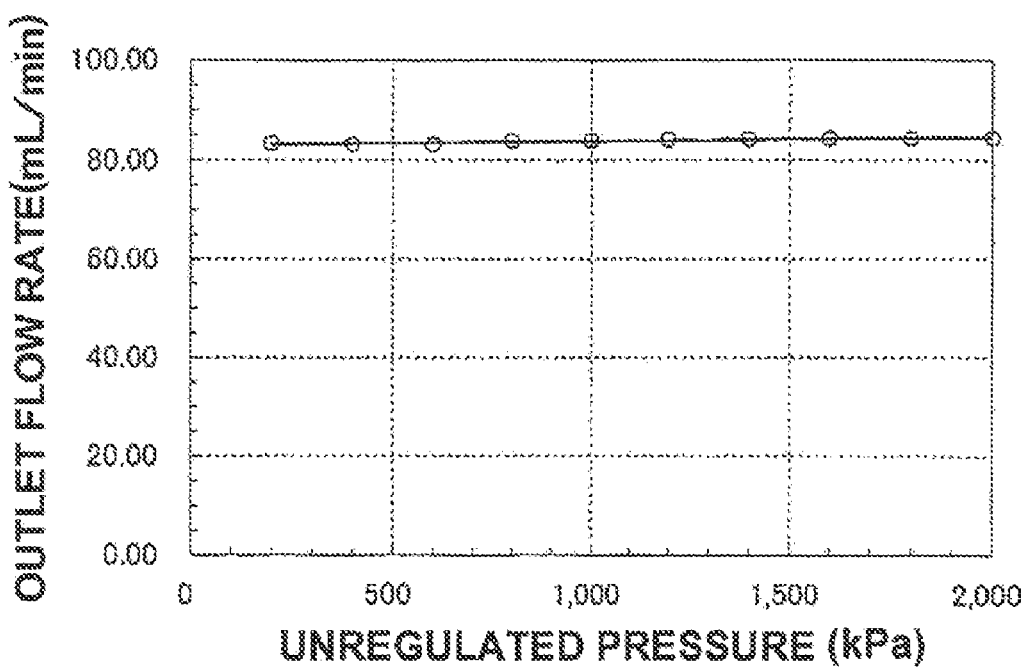
FIG. 12 is a graph showing the results of measurement of a variation in outlet flow rate, which results were obtained with the pressure regulator shown in FIG. 10 in cases where an unregulated pressure of a high-pressure gas supplied to the pressure regulator shown in FIG. 10 was altered.
Figure 13:
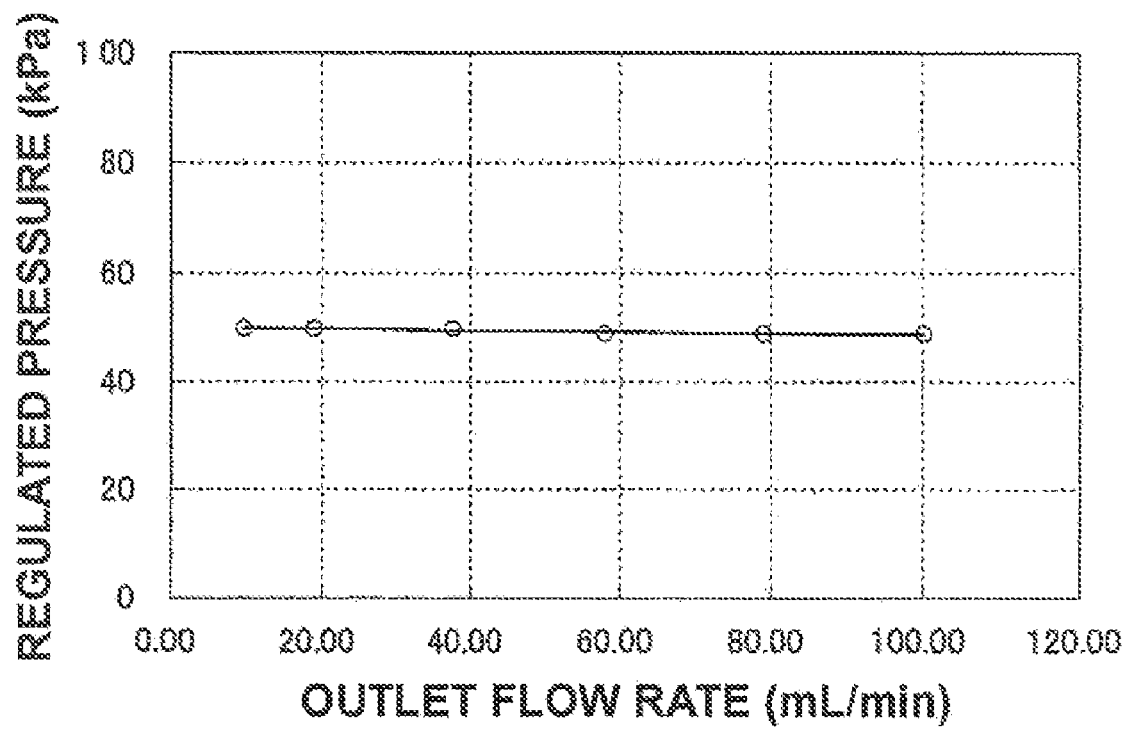
FIG. 13 is a graph showing the results of measurement of a variation in regulated pressure, which results were obtained with the pressure regulator shown in FIG. 10 in cases where an outlet flow rate in the pressure regulator shown in FIG. 10 was altered.

The results of experiments conducted for evaluating the pressure regulating effects of the third embodiment of the pressure regulator in accordance with the present invention (i.e., the pressure regulator 400 having the structure illustrated in FIG. 10) will be described hereinbelow with reference to FIG. 11, FIG. 12, and FIG. 13. FIG. 11 is a graph showing the results of measurement of a variation in regulated pressure, which results were obtained with the pressure, regulator shown in FIG. 10 in cases where an unregulated pressure of a high-pressure gas supplied to the pressure regulator shown in FIG. 10 was altered. FIG. 12 is a graph showing the results of measurement of a variation in outlet flow rate, which results were obtained with the pressure regulator shown in FIG. 10 in cases where an unregulated pressure of a high-pressure gas supplied to the pressure regulator shown in FIG. 10 was altered. FIG. 13 is a graph showing the results of measurement of a variation in regulated pressure, which results were obtained with the pressure regulator shown in FIG. 10 in cases where an outlet flow rate in the pressure regulator shown in FIG. 10 was altered.

As the fundamental setting, the pressure regulator 400 was set such that, in cases where the unregulated pressure was equal to 400 kPa, the intermediate pressure became equal to 110 kPa, the regulated pressure became equal to 50 kPa, and the flow rate became equal to 80 mL/min. In the experiments, an $N_2$ gas (which was one of inert gases) was used.

MEASUREMENT EXAMPLE 6

In Measurement Example 6, measurement was made to find a variation in regulated pressure in cases where an unregulated pressure was altered over the range of 200 kPa to 2000 kPa. The results of the measurement obtained with the pressure regulator 400 of FIG. 10 in the example in accordance with the present invention are shown in the graph of FIG. 11. As clear from FIG. 11, the regulated pressure did not vary with respect to the variation in unregulated pressure, and the regulated pressure equal to the set pressure of 50 kPa was capable of being obtained reliably.

The aforesaid range of the variation in unregulated pressure corresponded to the range of the variation in vapor pressure of the dimethyl ether gas at temperatures ranging from approximately 0° C. to approximately 80° C.)

MEASUREMENT EXAMPLE 7

In Measurement Example 7, measurement was made to find a variation in outlet flow rate in cases where an unregulated pressure was altered over the range of 200 kPa to 2000 kPa. The results of the measurement obtained with the pressure regulator 400 of FIG. 10 in the example in accordance with the present invention are shown in the graph of FIG. 12. As clear from FIG. 12, the outlet flow rate did not vary with respect to the variation in unregulated pressure, and the gas discharging rate equal to the set flow rate of 80 mL/min was capable of being obtained reliably.

MEASUREMENT EXAMPLE 8

In Measurement Example 8, measurement was made to find a variation in regulated pressure in cases where an unregulated pressure was set at 400 kPa (corresponding to the vapor pressure of the dimethyl ether gas at a temperature of approximately 23° C.), and the outlet flow rate (i.e., the gas discharging rate) was altered over the range of 10 mL/min to 100 mL/min. The results of the measurement obtained with the pressure regulator 400 of FIG. 10 in the example in accordance with the present invention are shown in the graph of FIG. 13. As clear from FIG. 13, the regulated pressure did not vary with respect to the variation in outlet flow rate, and the regulated pressure equal to the set pressure of 50 kPa was capable of being obtained reliably.

What is claimed is:

1. A pressure regulator, comprising: i) a gas introducing port, through which a high-pressure gas having an unregulated pressure is introduced into the pressure regulator, ii) a main regulating valve, which reduces the unregulated pressure of the high-pressure gas to a regulated pressure, a pressure loss occurring at the main regulating valve, iii) a pressure regulating chamber for relaxing pressure vibration of the gas, which has passed through the main regulating valve, iv) a diaphragm, which partitions off the pressure regulating chamber and an atmospheric chamber from each other, and which receives the regulated pressure within the pressure regulating chamber and is thereby displaced, v) a plunger, which interlocks the diaphragm and the main regulating valve with each other, vi) a pressure setting section for adjusting a quantity of the displacement of the diaphragm, vii) a gas discharging port, through which the gas having the regulated pressure is discharged from the pressure regulator, viii) a subsidiary regulating valve, which operates by being interlocked with the main regulating valve through the plunger and which reduces the unregulated pressure of the high-pressure gas to the regulated pressure, a pressure loss occurring at the subsidiary regulating valve, the subsidiary regulating valve being located such that the force, which accompanies the pressure loss occurring at the subsidiary regulating valve and which the subsidiary regulating valve receives, cancels the force, which accompanies the pressure loss occurring at the main regulating valve and which acts upon the plunger, and ix) adjustment means, which is capable of adjusting a value of the pressure loss occurring at the subsidiary regulating valve, the adjustment means being adjusted such that the value of the pressure loss, which the main regulating valve receives, and the value of the pressure loss, which the subsidiary regulating valve receives, become equal to each other;

wherein either one of a valve body and a valve seat of the main regulating valve comprises an elastic body, either one of a valve body and a valve seat of the subsidiary regulating valve comprises an elastic body, and each of the elastic body of the main regulating valve and the elastic body of the subsidiary regulating valve is located in a state in which the elastic body is controlled such that the elastic body is prevented from deforming with respect to directions of valve opening and closing movements;

wherein each of the elastic body of the main regulating valve and the elastic body of the subsidiary regulating valve is constituted of an O-ring; and wherein the pressure regulator is used for stabilization of fuel supply to solid oxide type fuel cells and solid polymer type fuel cells.

2. A pressure regulator, comprising: i) a gas introducing port, through which a high-pressure gas having an unregulated pressure is introduced into the pressure regulator, ii) a main regulating valve, which performs gas pressure reduction to a regulated pressure, a pressure loss occurring at the main regulating valve, iii) a pressure regulating chamber for relaxing pressure vibration of the gas, which has passed through the main regulating valve, iv) a diaphragm, which partitions off the pressure regulating chamber and an atmospheric chamber from each other, and which receives the regulated pressure within the pressure regulating chamber and is thereby displaced, v) a plunger, which interlocks the diaphragm and the main regulating valve with each other, vi) a pressure setting section for adjusting a quantity of the displacement of the diaphragm, vii) a gas discharging port, through which the gas having the regulated pressure is discharged from the pressure regulator, and viii) a preliminary regulating valve, which operates by being interlocked with the main regulating valve through the plunger and which reduces the unregulated pressure of the high-pressure gas from the gas introducing port at a stage prior to the main regulating valve, a pressure loss occurring at the preliminary regulating valve, the gas, which has a pressure having thus been reduced by the preliminary regulating valve, being allowed to flow to the main regulating valve;

wherein a casing in which the diaphragm is located is constituted of a material selected from the group consisting of a polyamide, a polyacetal, a polybutylene terephthalate, or a polypropylene, which is a crystalline resin; and an acetal, a polycarbonate, or acrylonitrile-butadiene-styrene, which is a non-crystalline resin, the non-crystalline resin having a surface coated with an epoxy resin or a polyamide resin;

wherein the casing in which the diaphragm is located is constituted of the polyamide, the polyacetal, the polybutylene terephthalate, or the polypropylene, which is the crystalline resin, and the casing is formed with ultrasonic fusion bonding; and wherein the pressure regulator is used for stabilization of fuel supply to solid oxide type fuel cells and solid polymer type fuel cells.

* * * * *